(12) United States Patent
Jerez

(10) Patent No.: US 11,350,566 B2
(45) Date of Patent: Jun. 7, 2022

(54) BLADES, PLUGS AND MULTI-TOOL CONNECTORS FOR USE WITH ROTARY HEAD ASSEMBLY

(71) Applicant: Orlando Jerez, Kenner, LA (US)

(72) Inventor: Orlando Jerez, Kenner, LA (US)

( * ) Notice: Subject to any disclaimer, the term of this patent is extended or adjusted under 35 U.S.C. 154(b) by 0 days.

(21) Appl. No.: 16/406,592

(22) Filed: May 8, 2019

(65) Prior Publication Data

US 2019/0261556 A1 Aug. 29, 2019

Related U.S. Application Data

(63) Continuation-in-part of application No. 14/617,398, filed on Feb. 9, 2015, which is a continuation-in-part of application No. PCT/US2013/053801, filed on Aug. 6, 2013.

(60) Provisional application No. 61/681,304, filed on Aug. 9, 2012, provisional application No. 62/041,945, filed on Aug. 26, 2014.

(51) Int. Cl.
*A01D 34/416* (2006.01)

(52) U.S. Cl.
CPC ....... *A01D 34/416* (2013.01); *A01D 34/4166* (2013.01)

(58) Field of Classification Search
None
See application file for complete search history.

(56) References Cited

U.S. PATENT DOCUMENTS

| | | | | |
|---|---|---|---|---|
| 7,603,782 B2* | 10/2009 | Jerez | ............... | A01D 34/416 30/276 |
| 7,913,401 B2* | 3/2011 | Iacona | ............... | A01D 34/733 30/275.4 |
| 8,973,274 B2* | 3/2015 | Proulx | ............... | A01D 34/4166 30/276 |
| 9,210,838 B2* | 12/2015 | Jerez | ............... | A01D 34/4166 |
| 9,764,489 B2* | 9/2017 | Arnetoli | ............... | A01D 34/733 |
| 10,070,583 B2* | 9/2018 | Jerez | ............... | A01D 34/4166 |
| 10,531,609 B2* | 1/2020 | Jerez | ............... | A01D 34/4165 |
| 2008/0010836 A1* | 1/2008 | Iacona | ............... | A01D 34/733 30/122 |

(Continued)

*Primary Examiner* — Hwei-Siu C Payer
(74) *Attorney, Agent, or Firm* — Norton IP Law Firm LLC; Taylor M. Norton

(57) ABSTRACT

Cutting blades are disclosed for use with a rotary trimmer head assembly with one or more swiveling blade receptacles, where the receptacle has a cylindrical body which defines a passage therethrough for a trimmer blade. The cutting blade preferably has a connecting end portion defining a blade mount aperture adapted to receive the swiveling blade receptacle. A male plug connection member is disposed within the blade mount aperture and preferably has bowed spring arms which are resiliently inwardly deformable, which are urged inwardly upon insertion into the female blade receptacle. The spring arms flex outwardly upon passage through the female receptacle. A multitool retention device is disclosed having a mount aperture end adapted to receive the receptacle and a tool retention end comprising at least one tool retention arm defining an elongated retention slot configured to slidingly receive and retain at least one tool member having a flange at one end of the tool member.

9 Claims, 47 Drawing Sheets

(56) References Cited

U.S. PATENT DOCUMENTS

| 2015/0201557 A1* | 7/2015 | Jerez | A01D 34/4166 |
| | | | 30/276 |
| 2019/0261556 A1* | 8/2019 | Jerez | A01D 34/416 |
| 2020/0352095 A1* | 11/2020 | Jerez | A01D 34/736 |

* cited by examiner

SECTION D-D

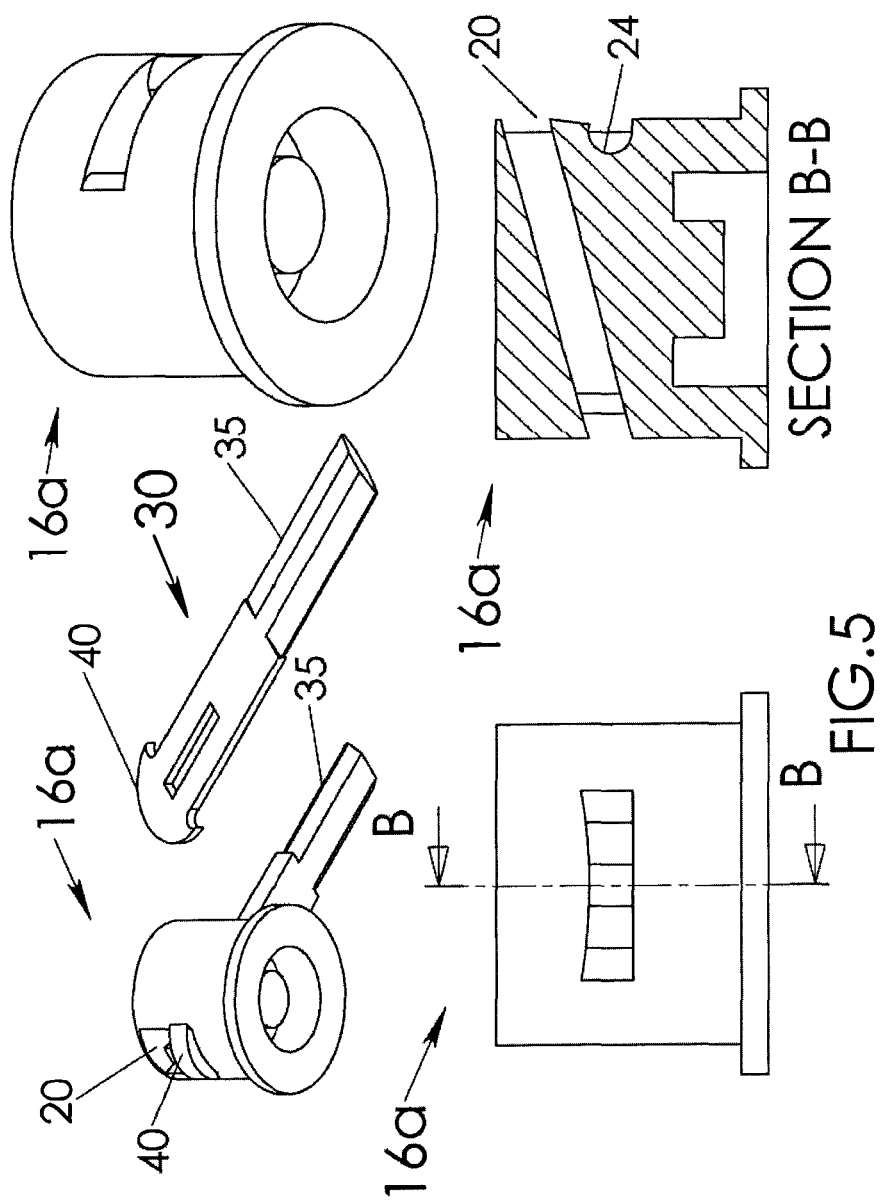

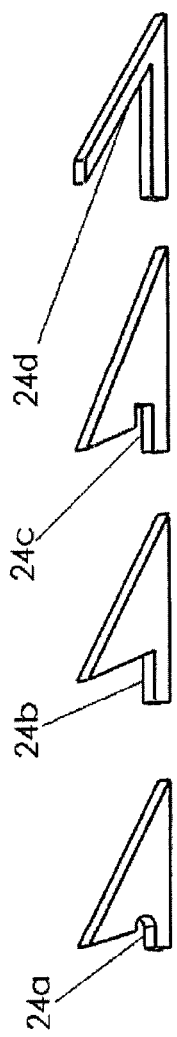

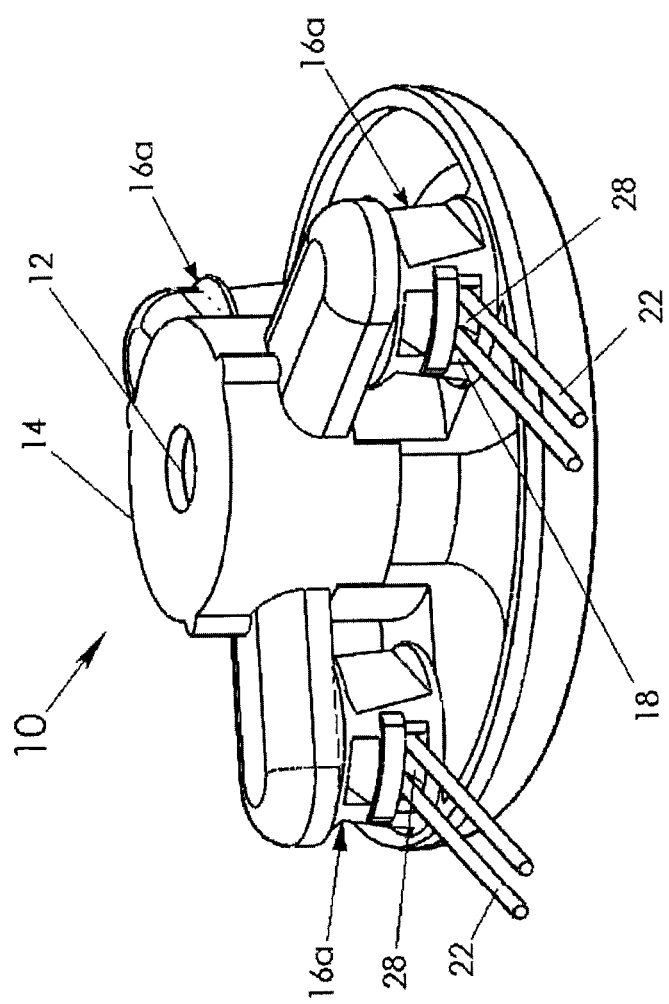

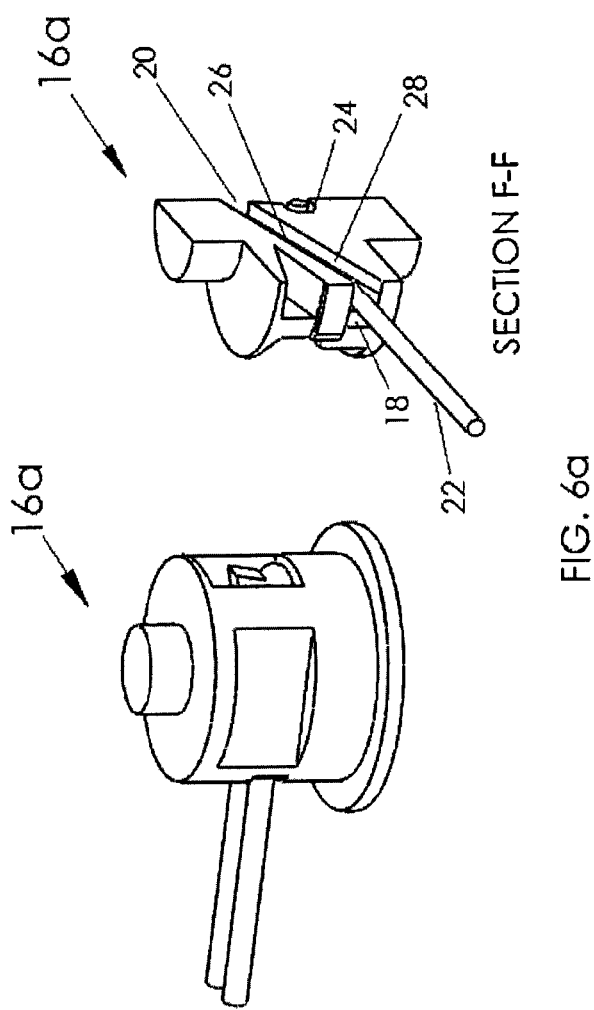

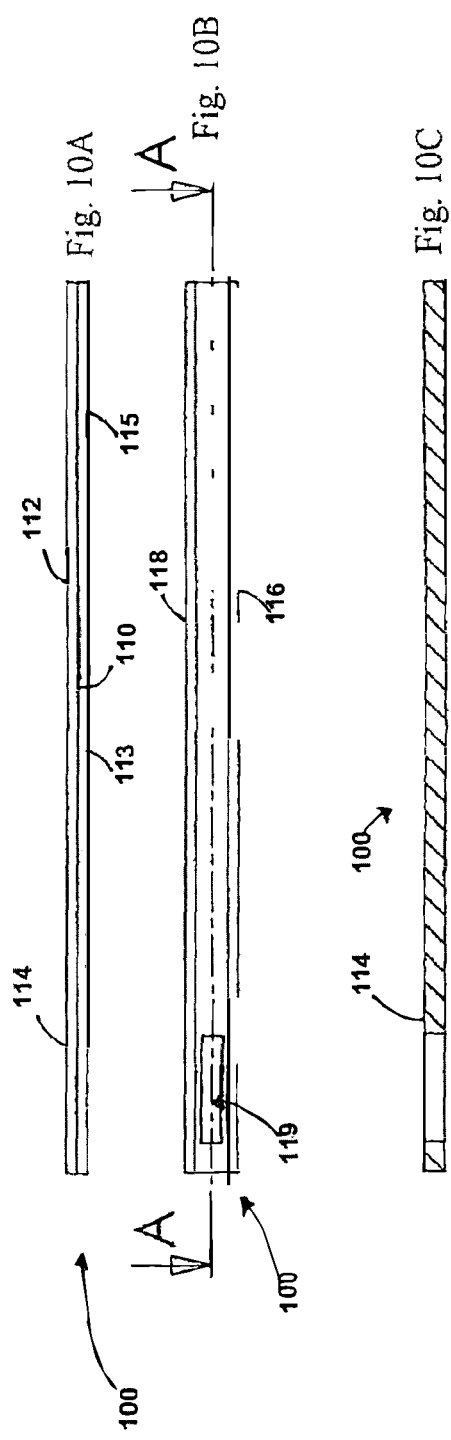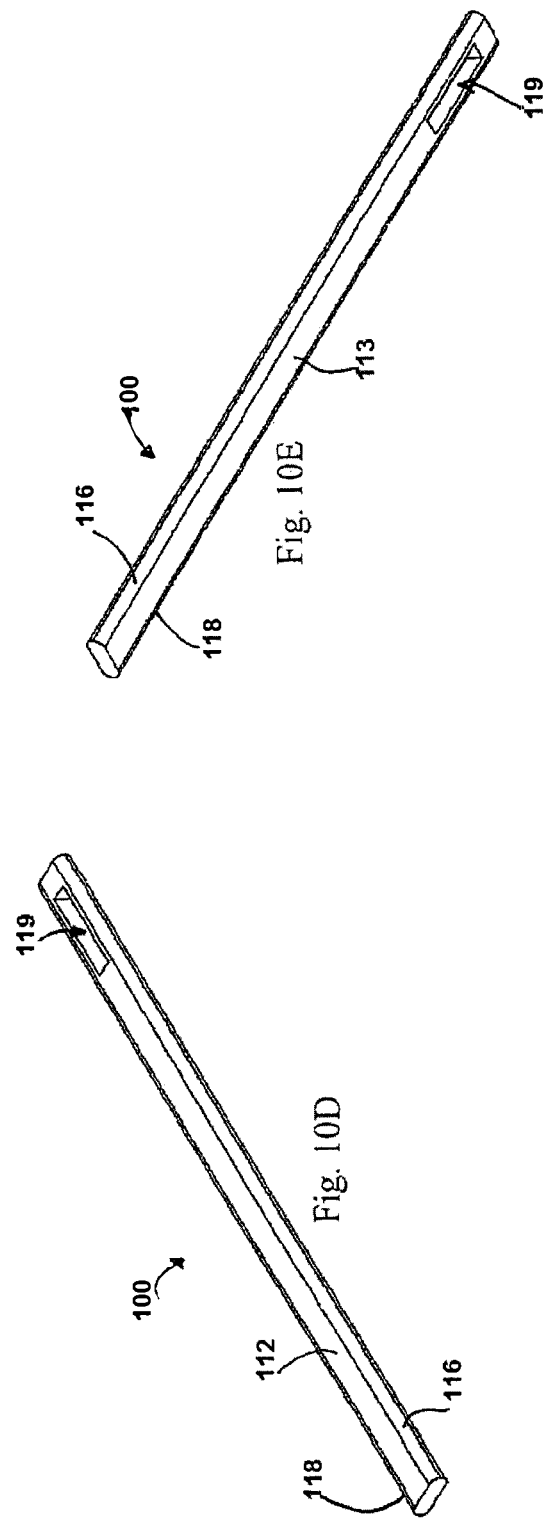

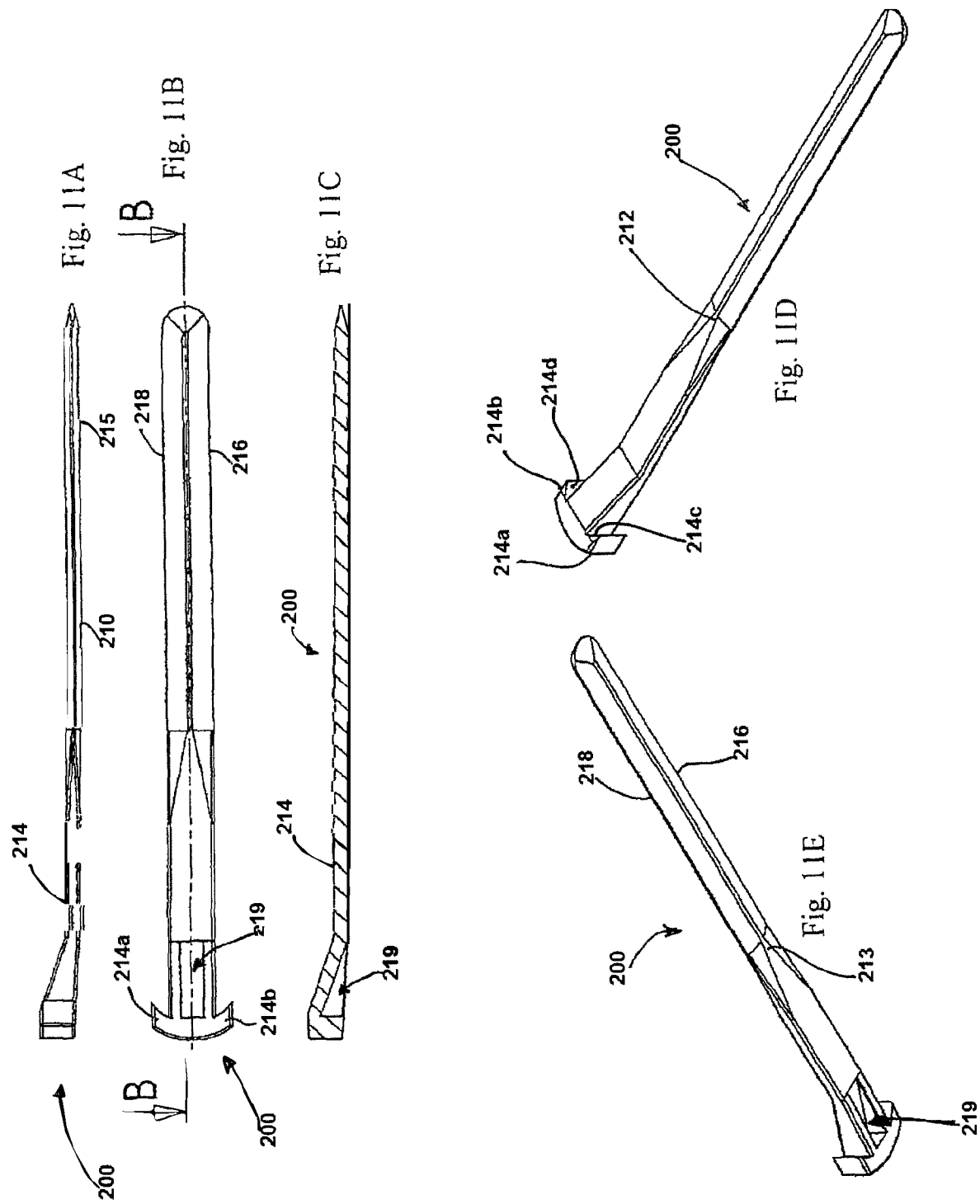

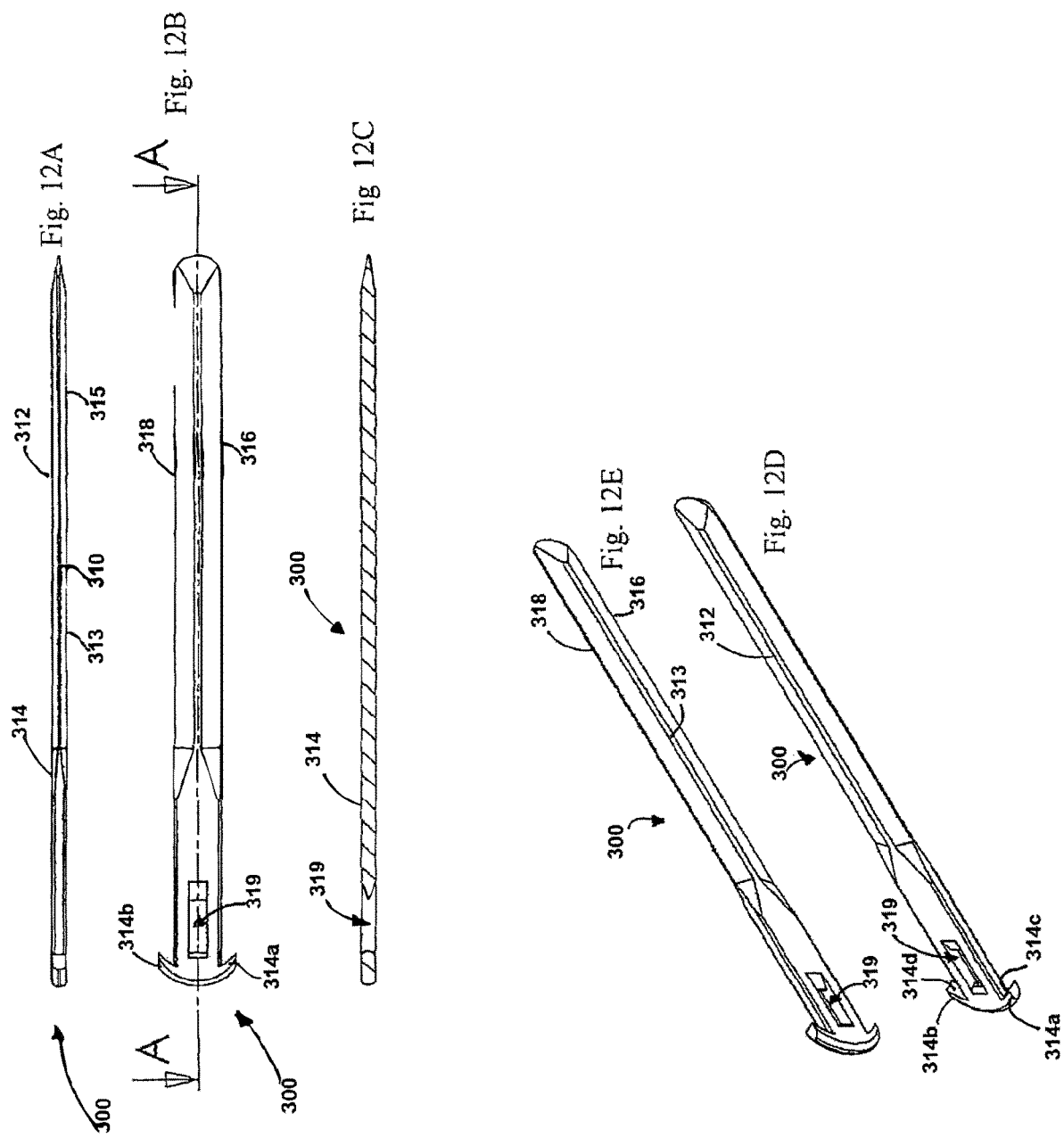

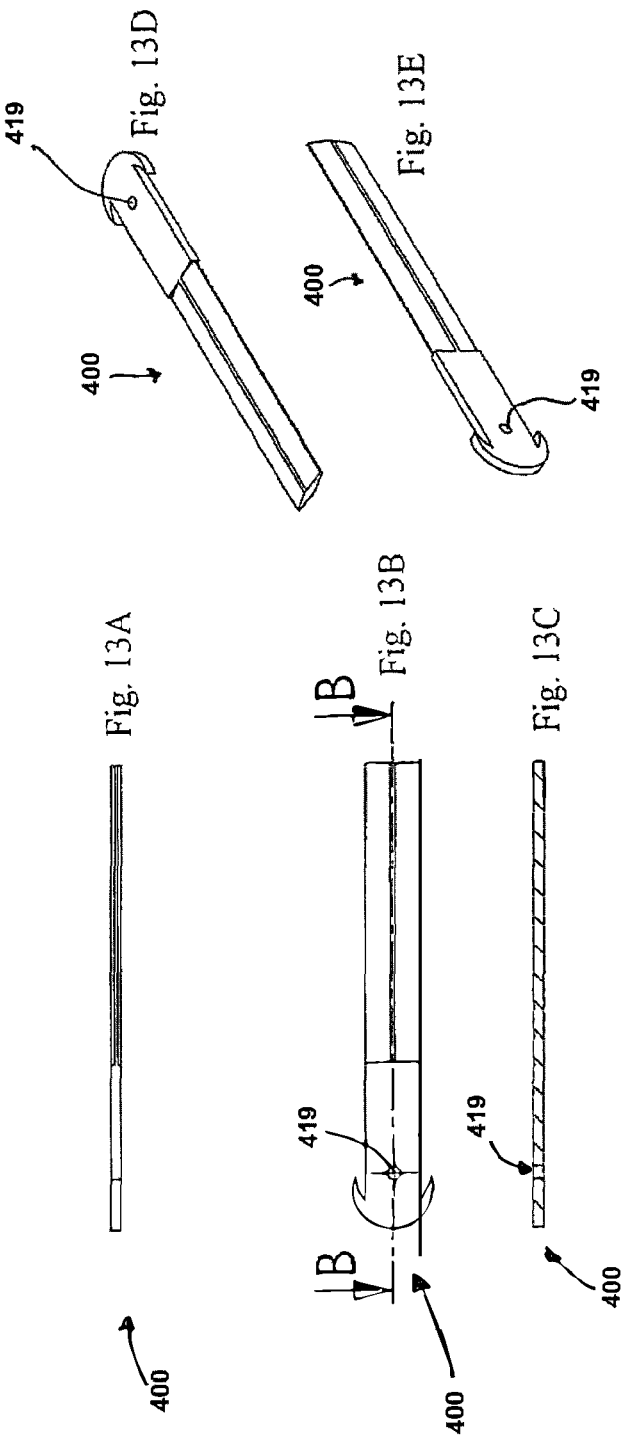

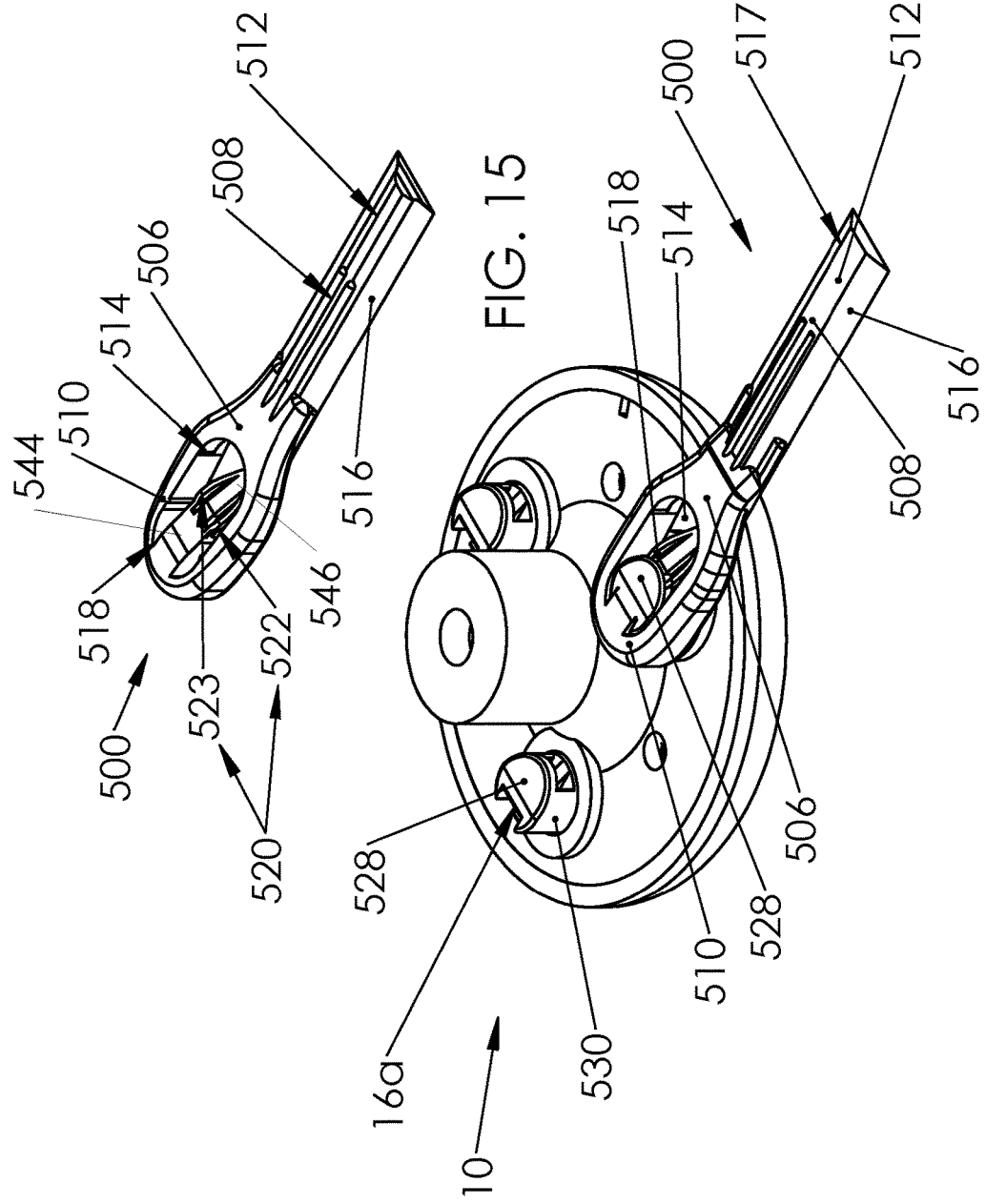

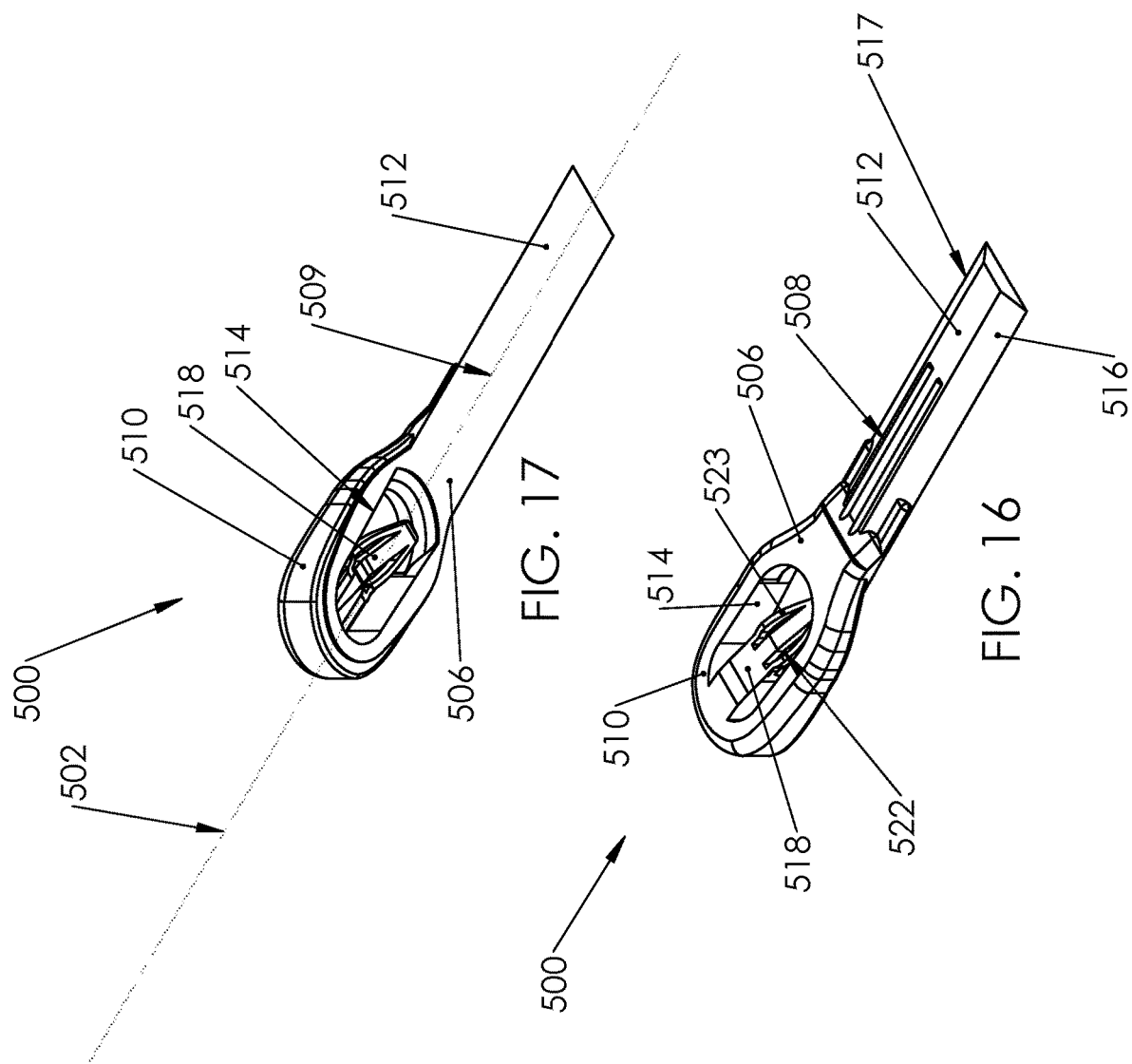

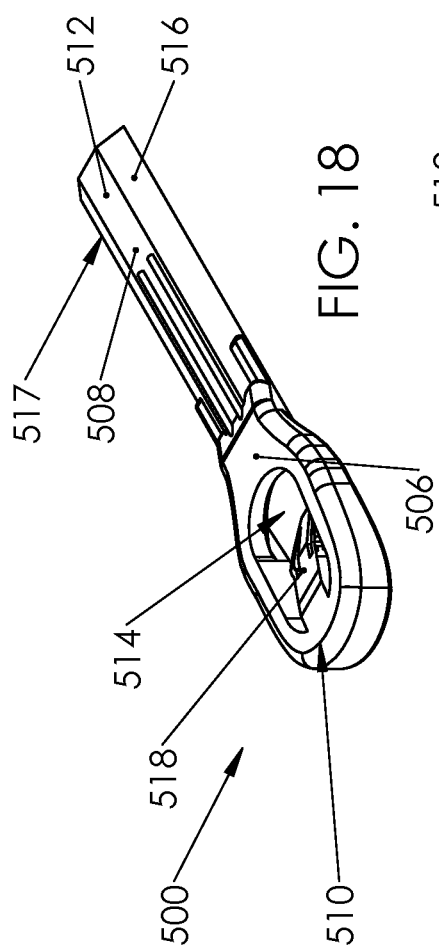
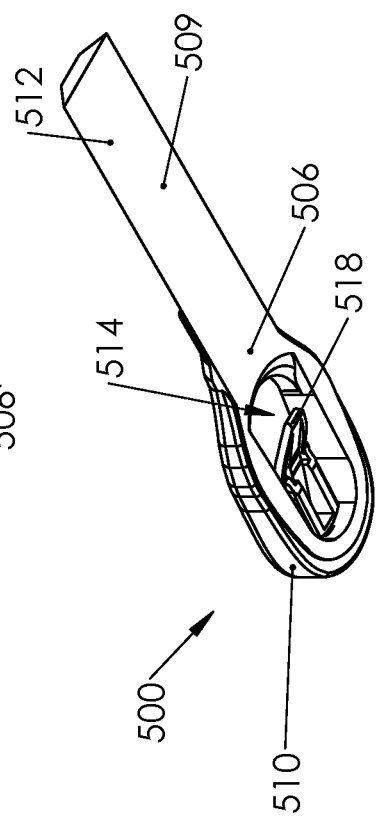
FIG. 18
FIG. 19

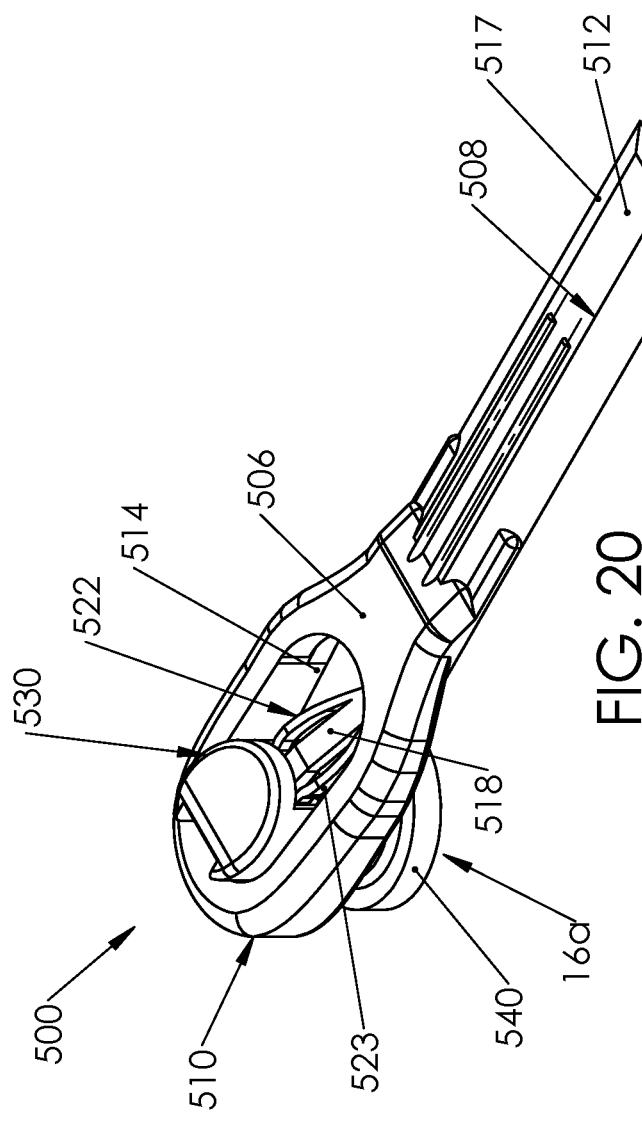
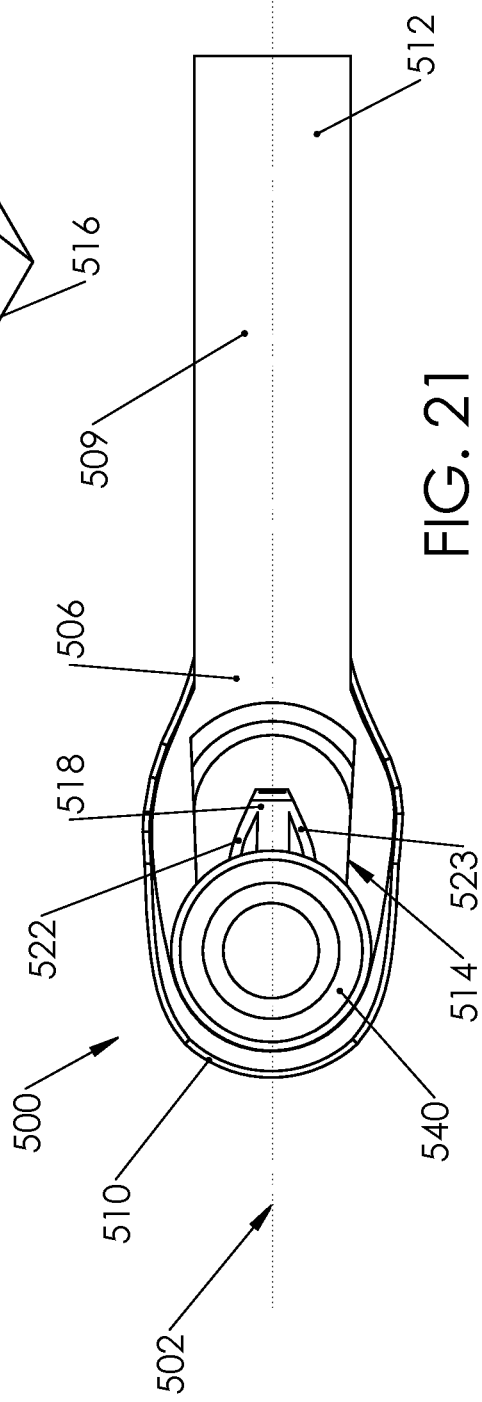

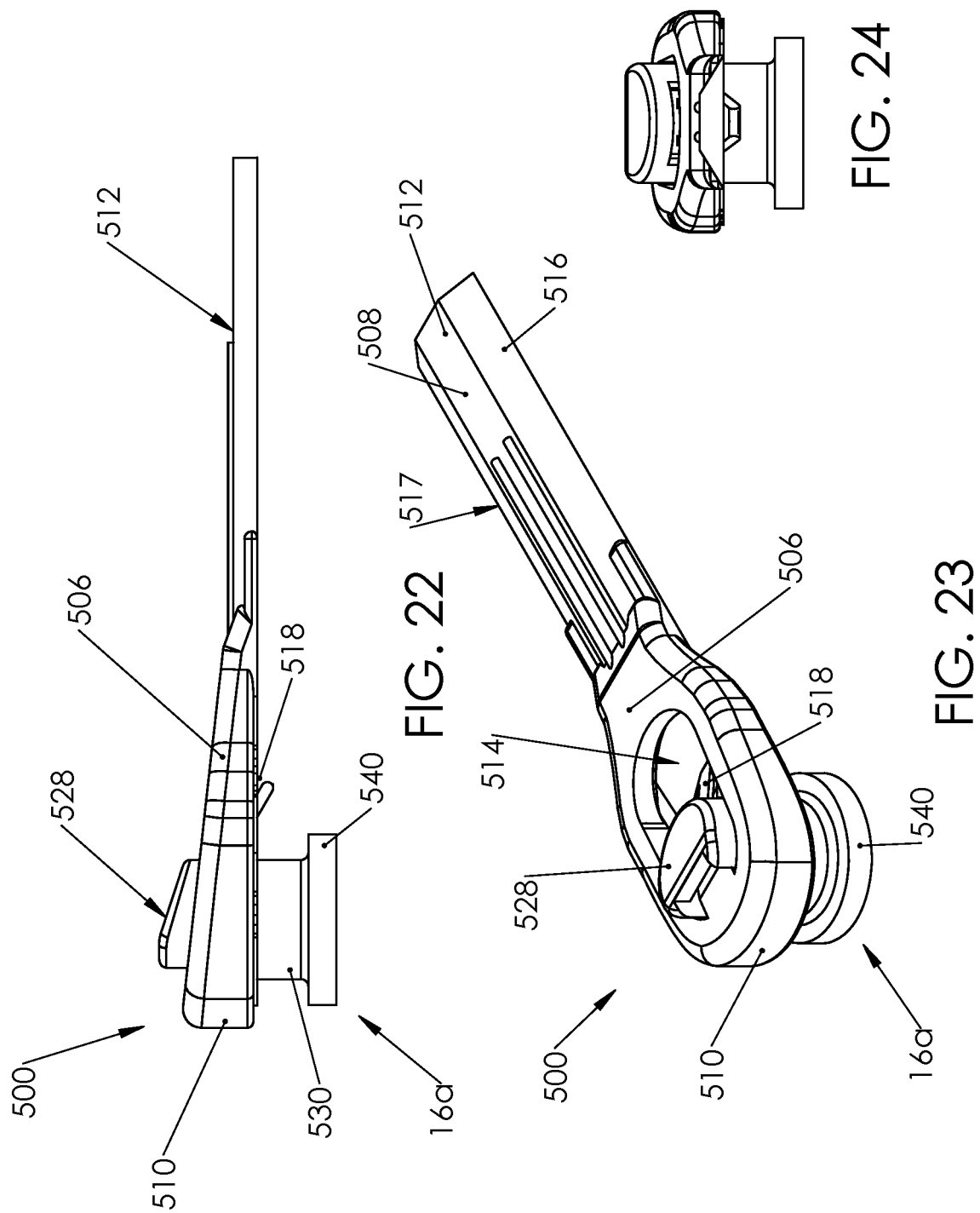

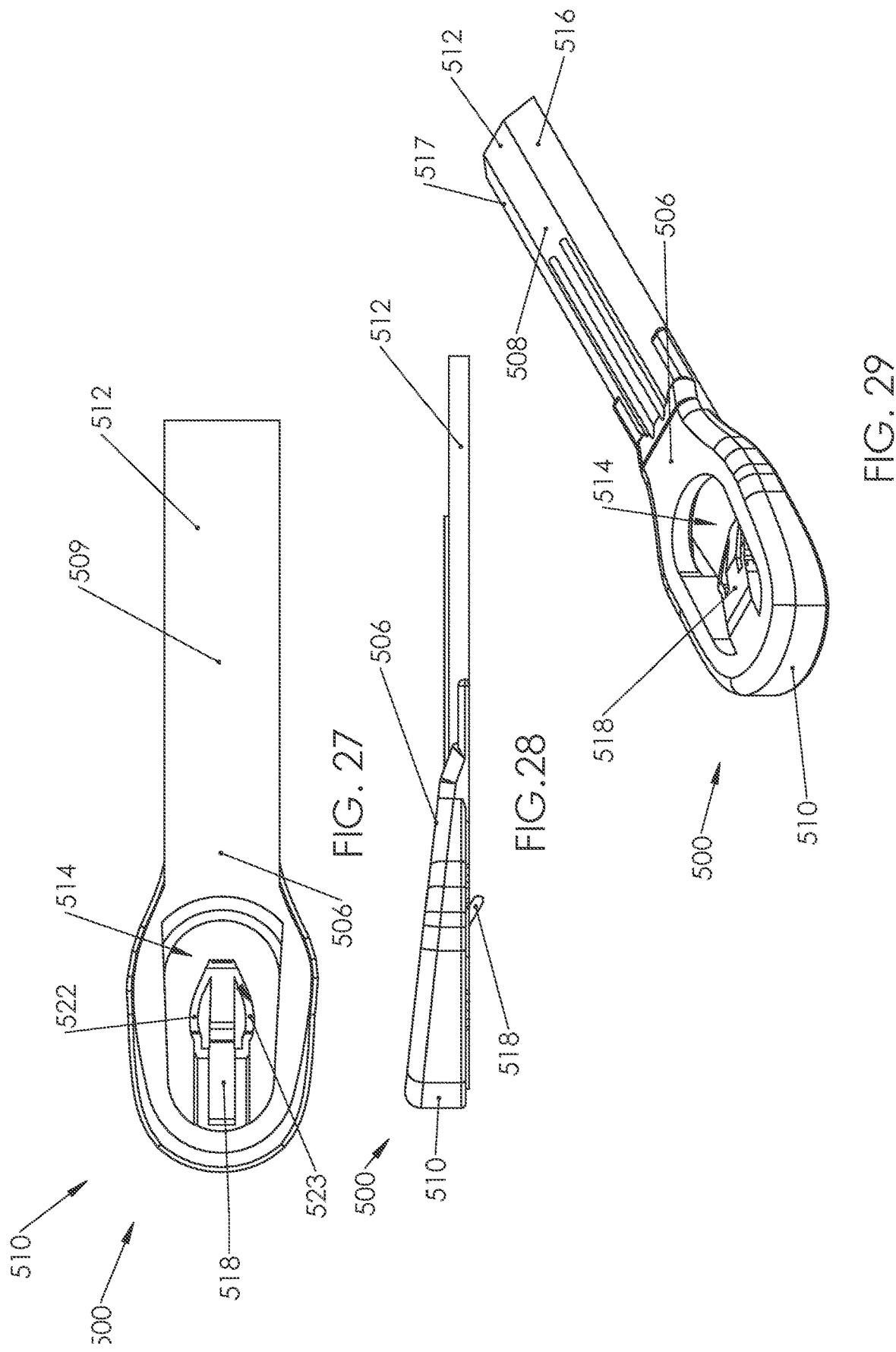

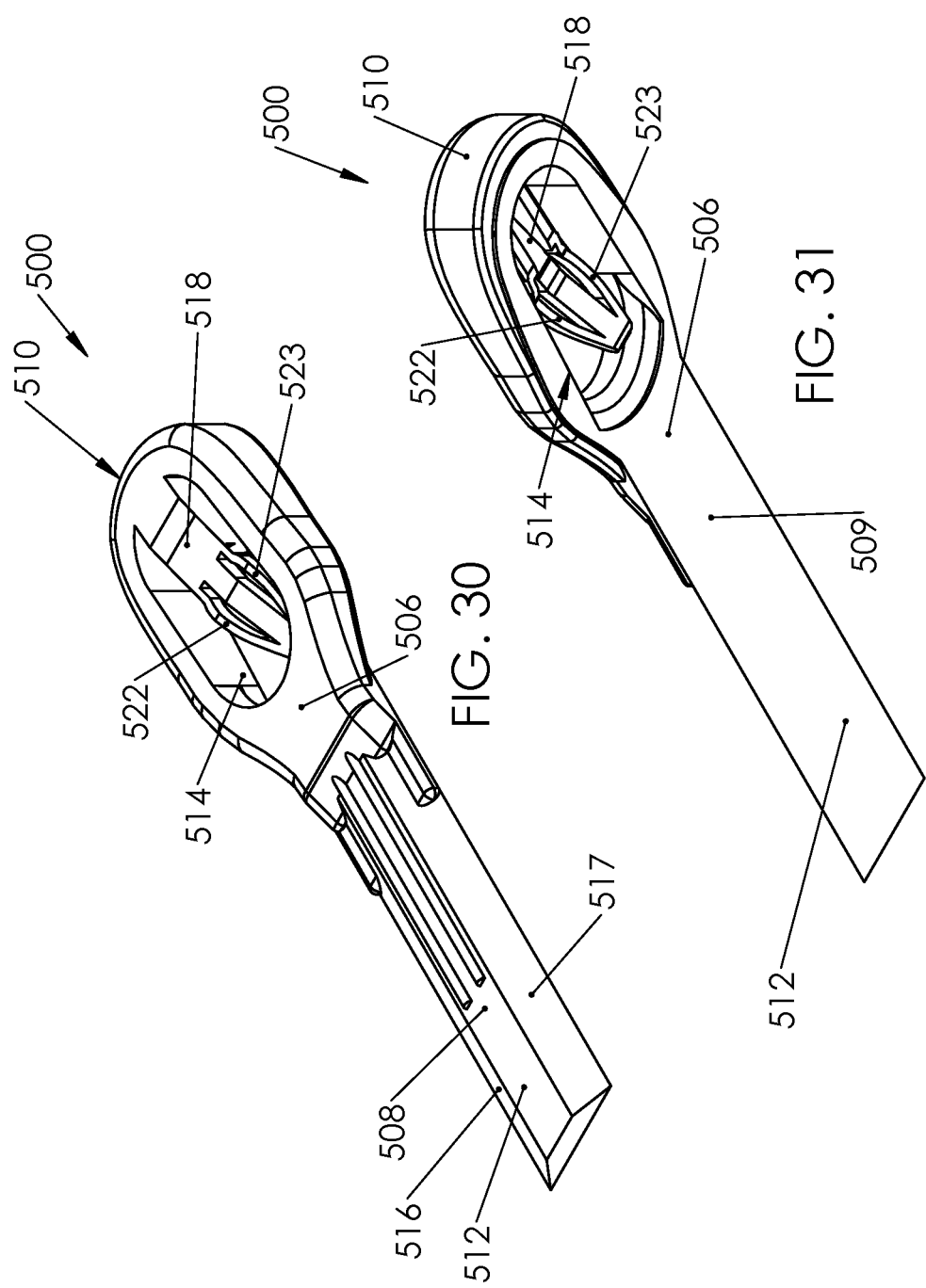

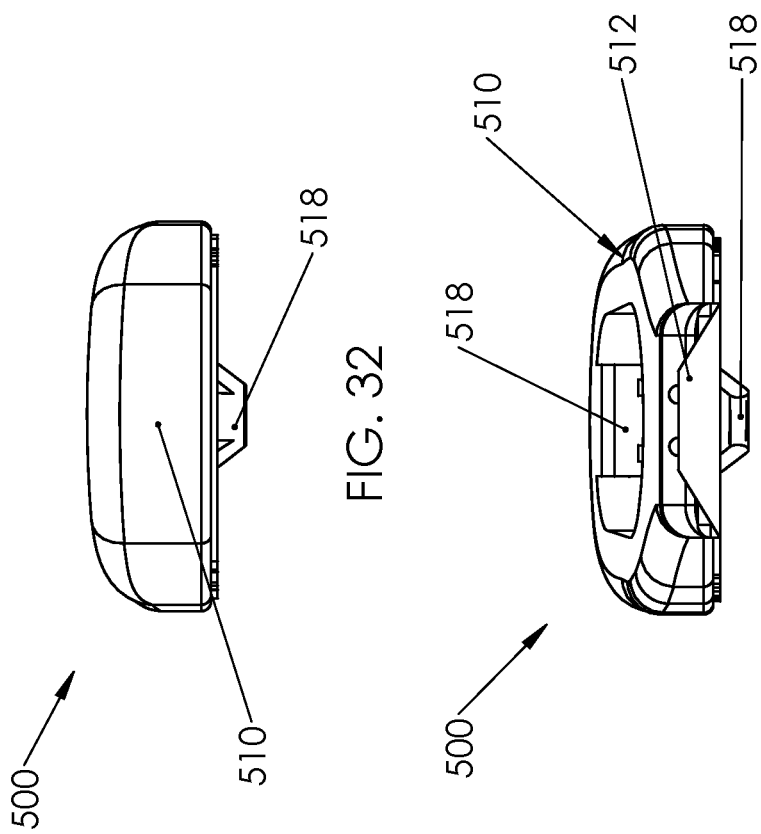

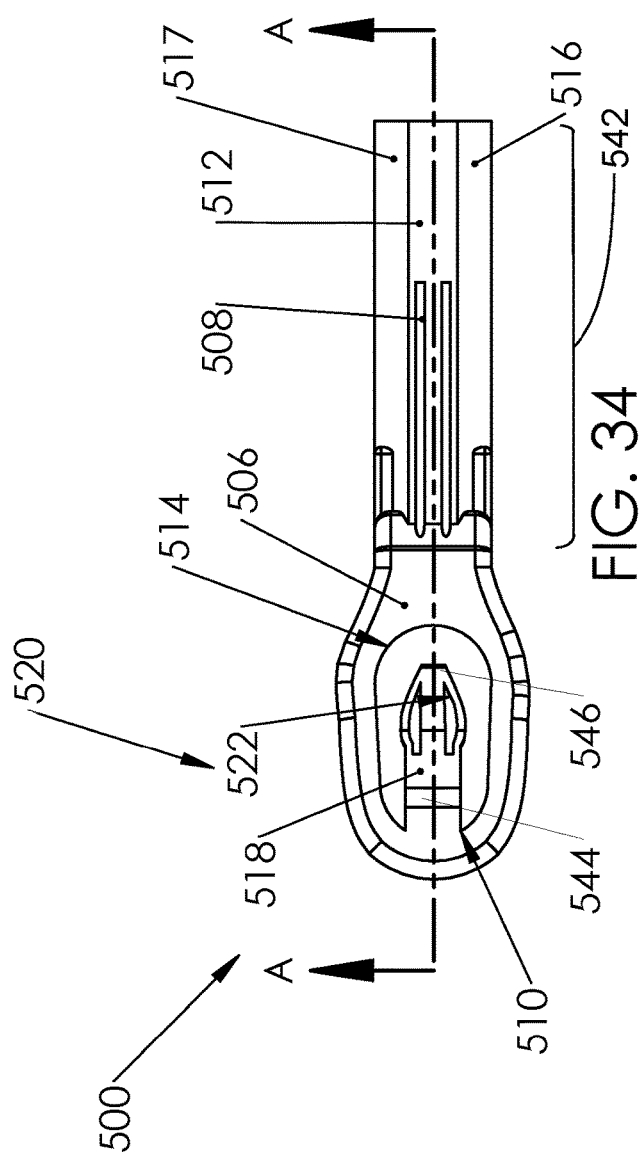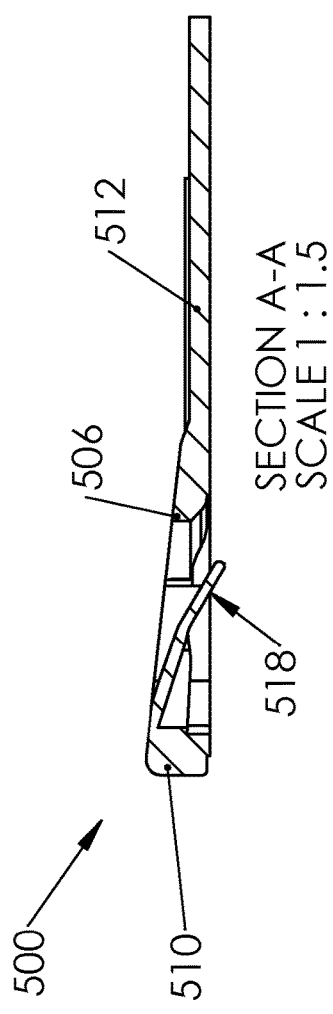
FIG. 34
FIG. 35

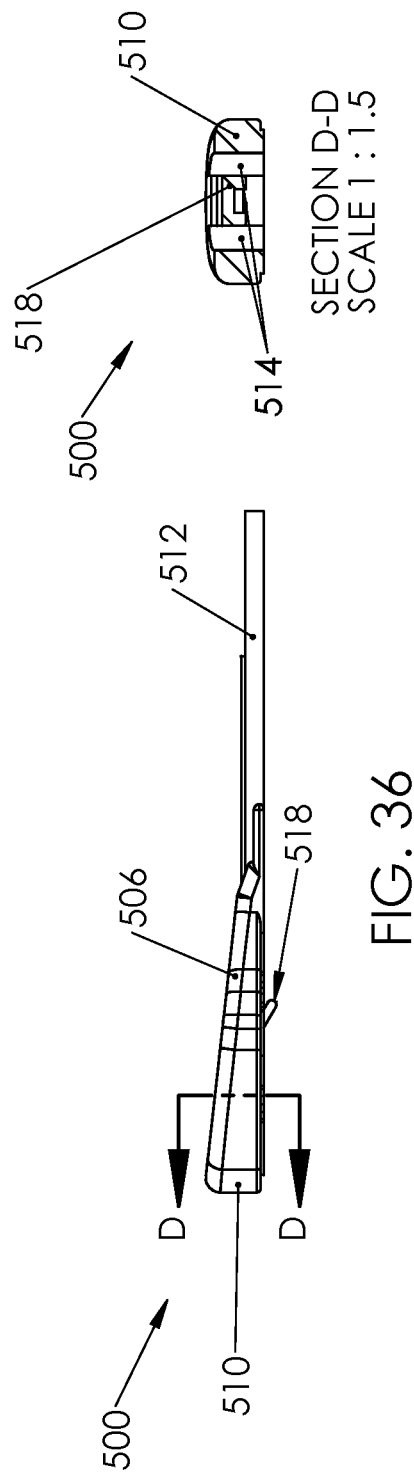

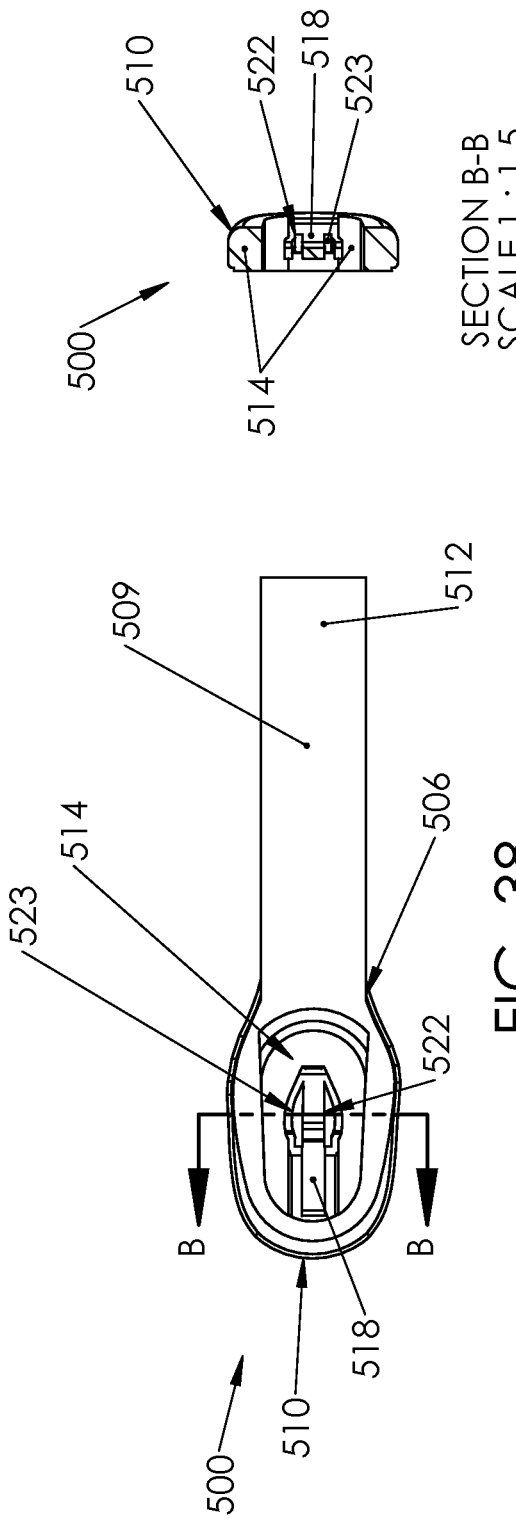

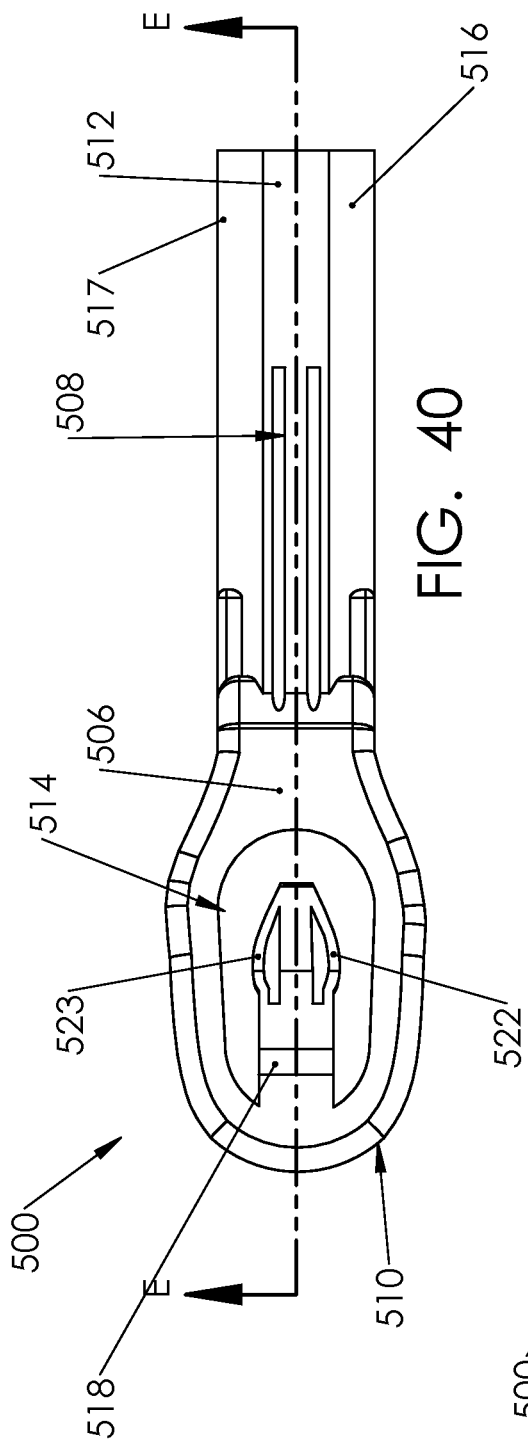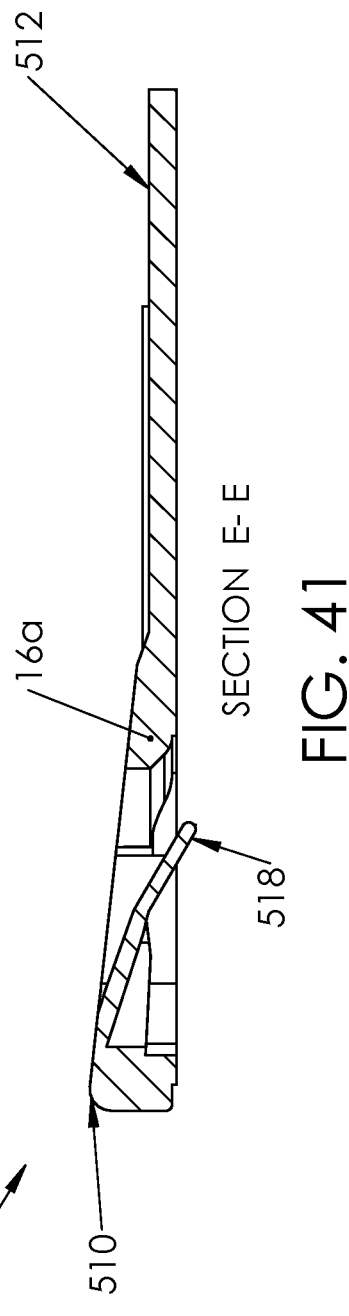

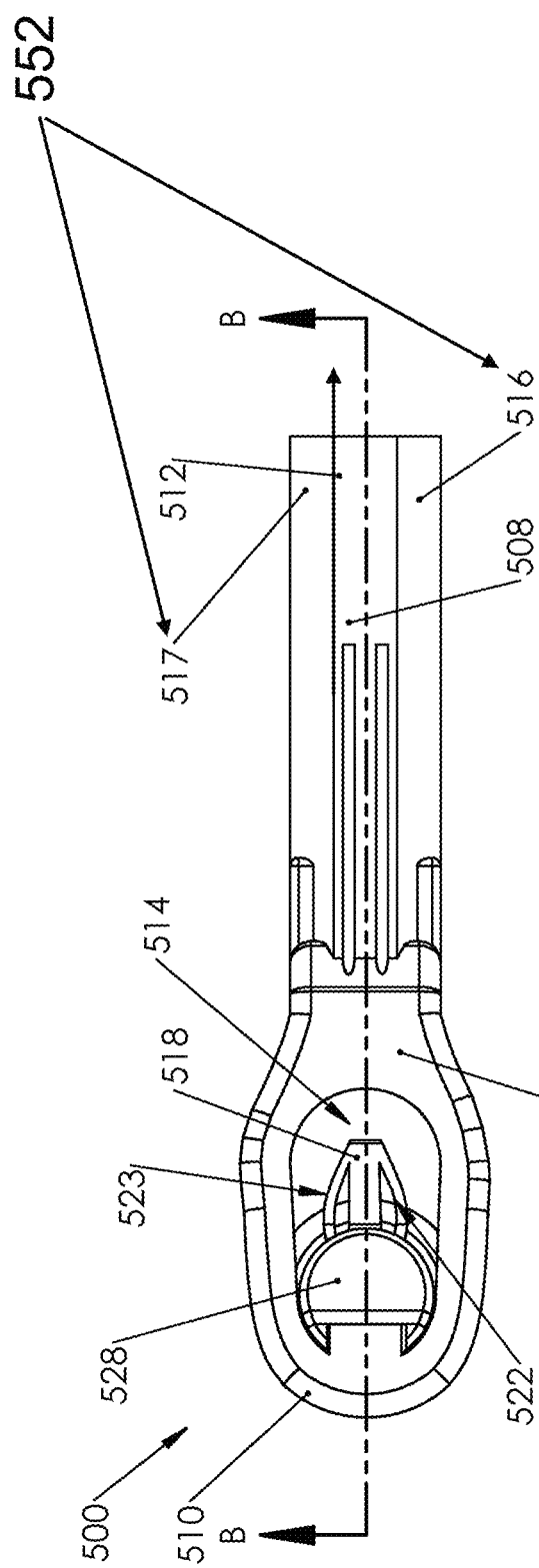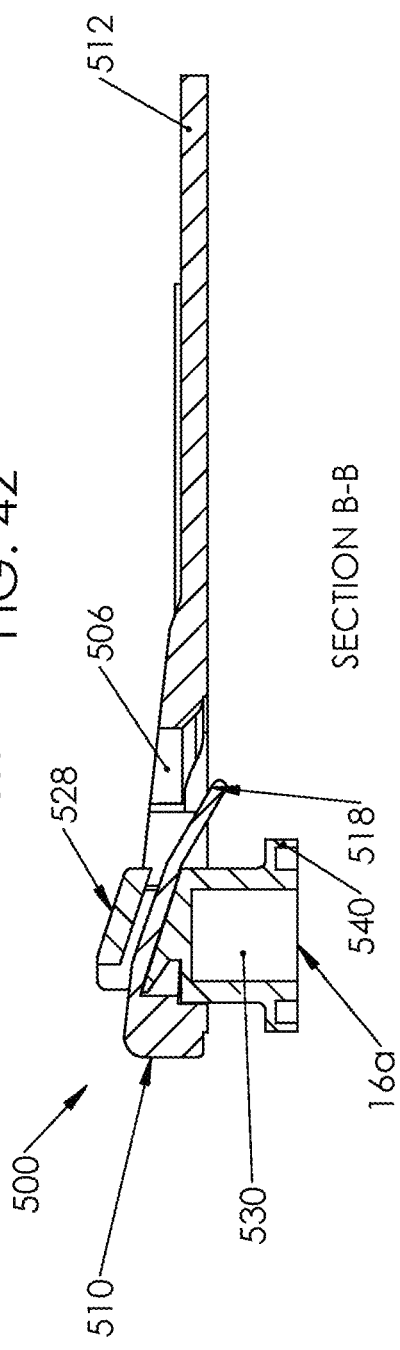
FIG. 42
FIG. 43 SECTION B-B

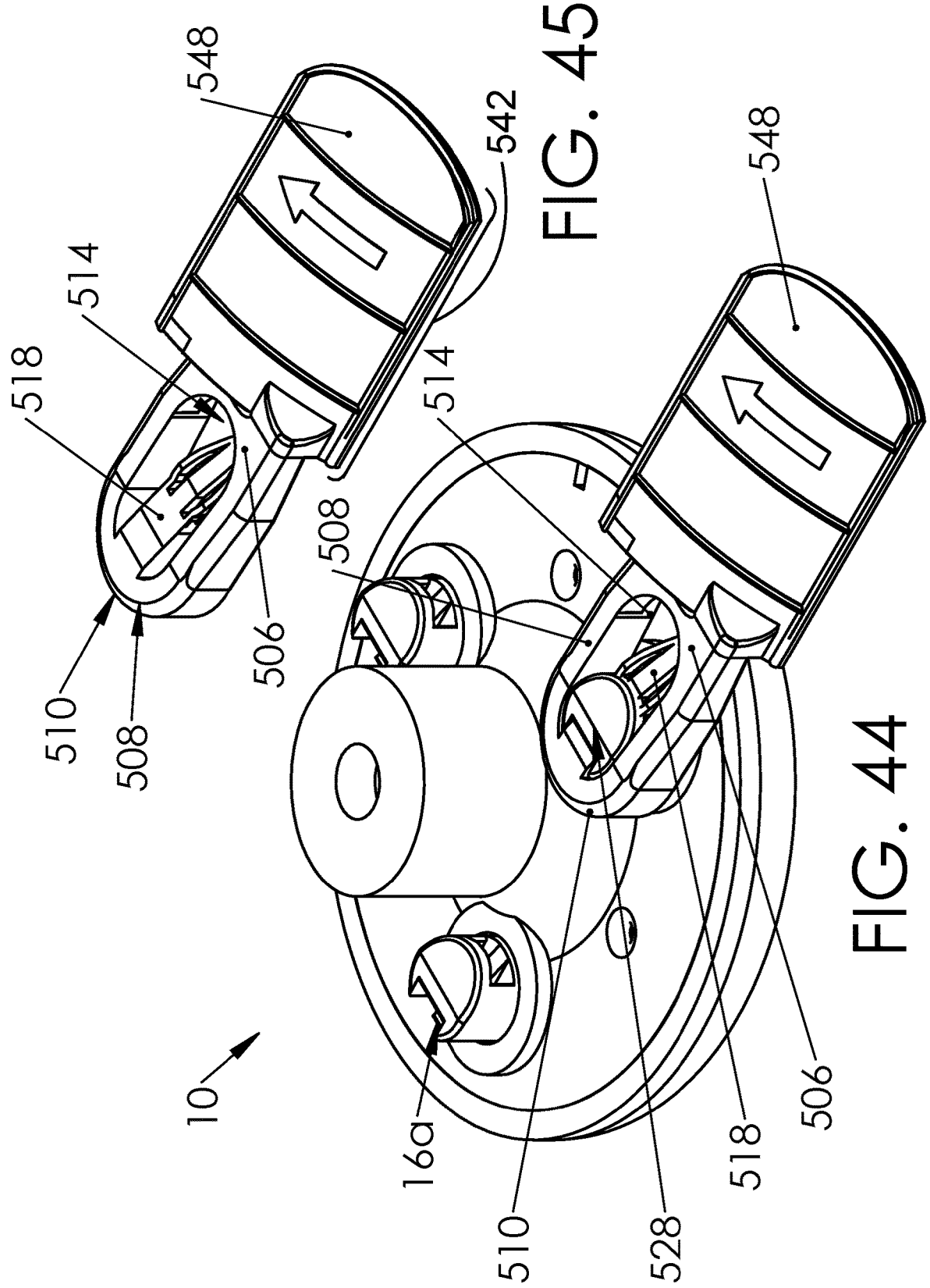

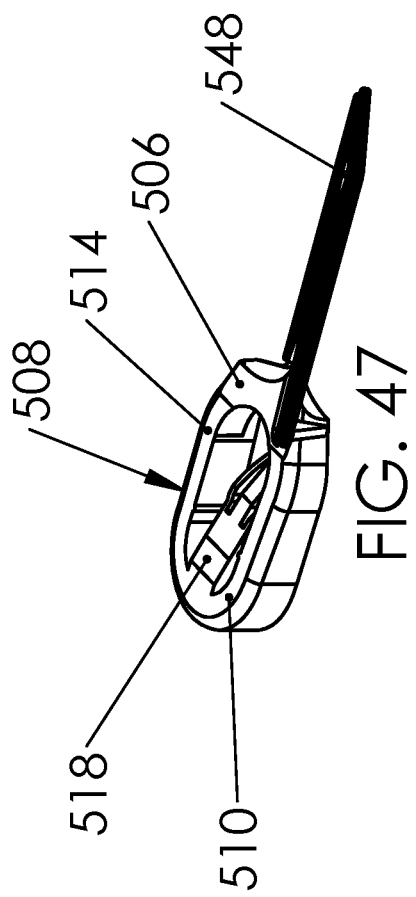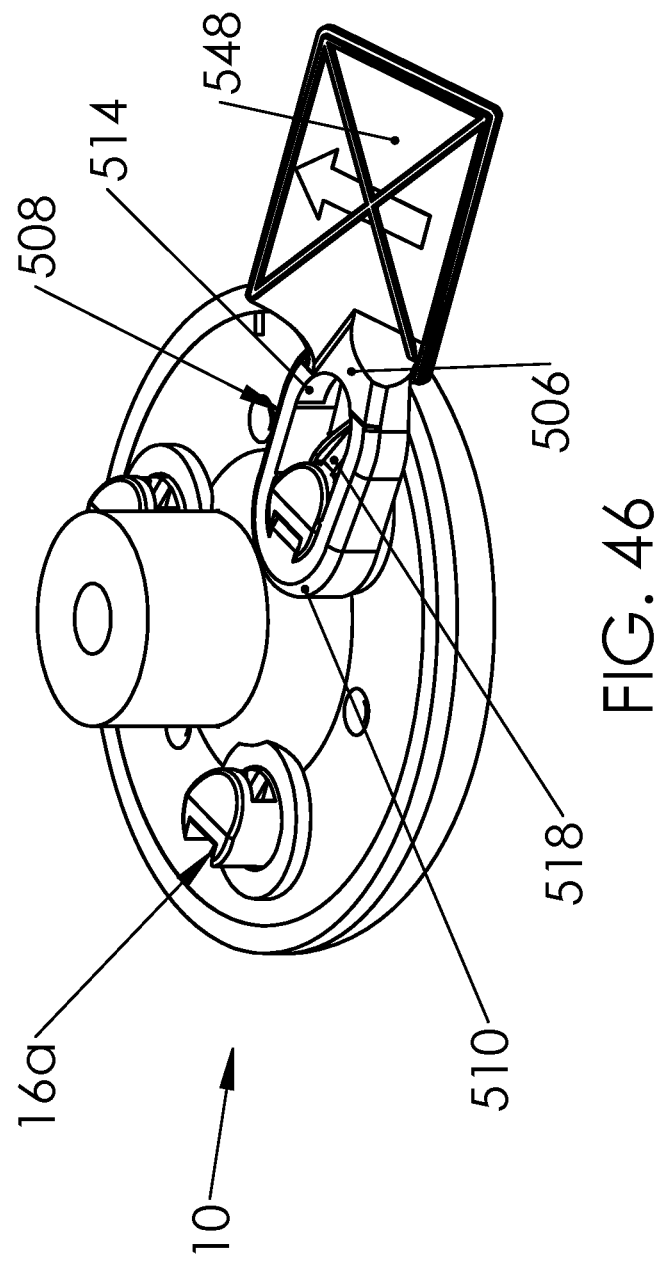

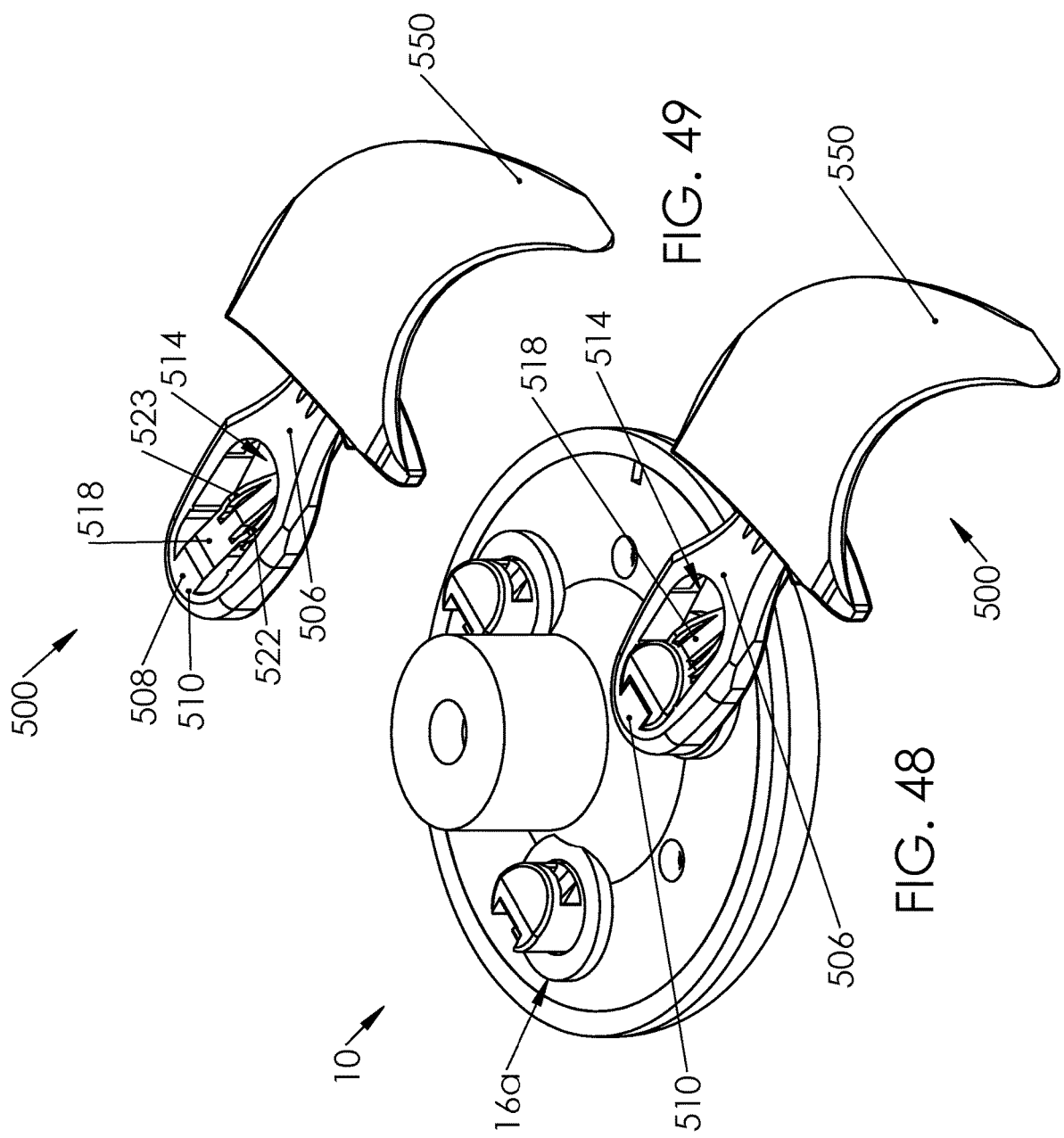

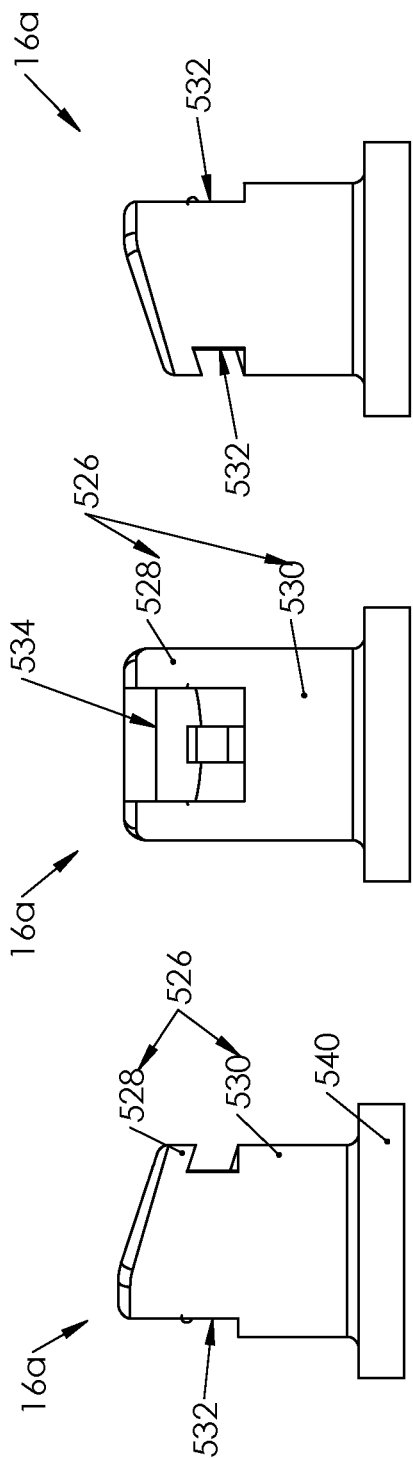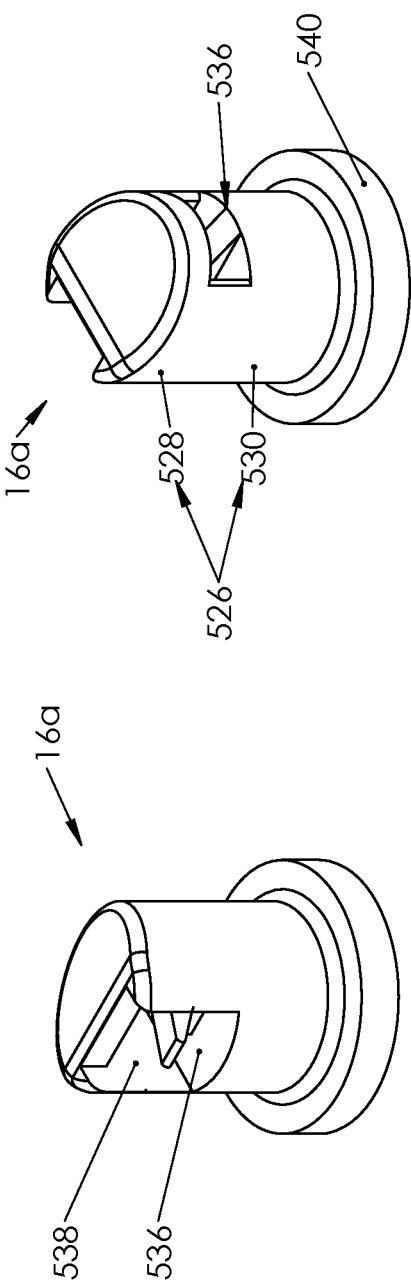

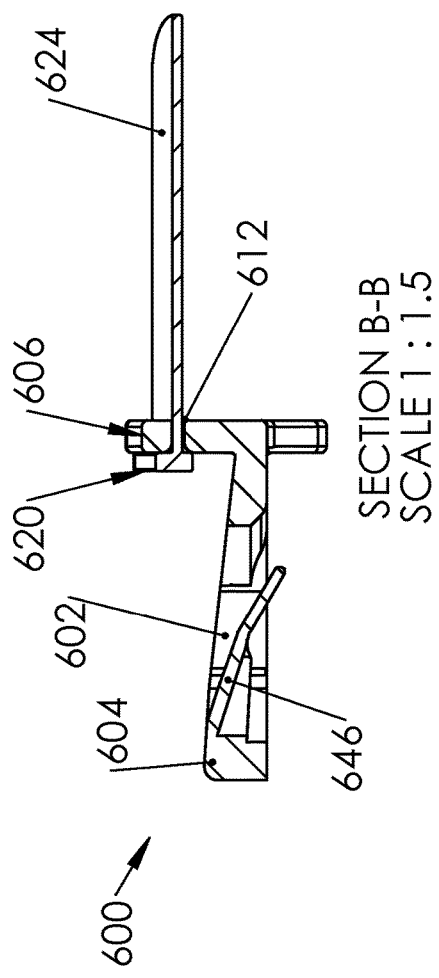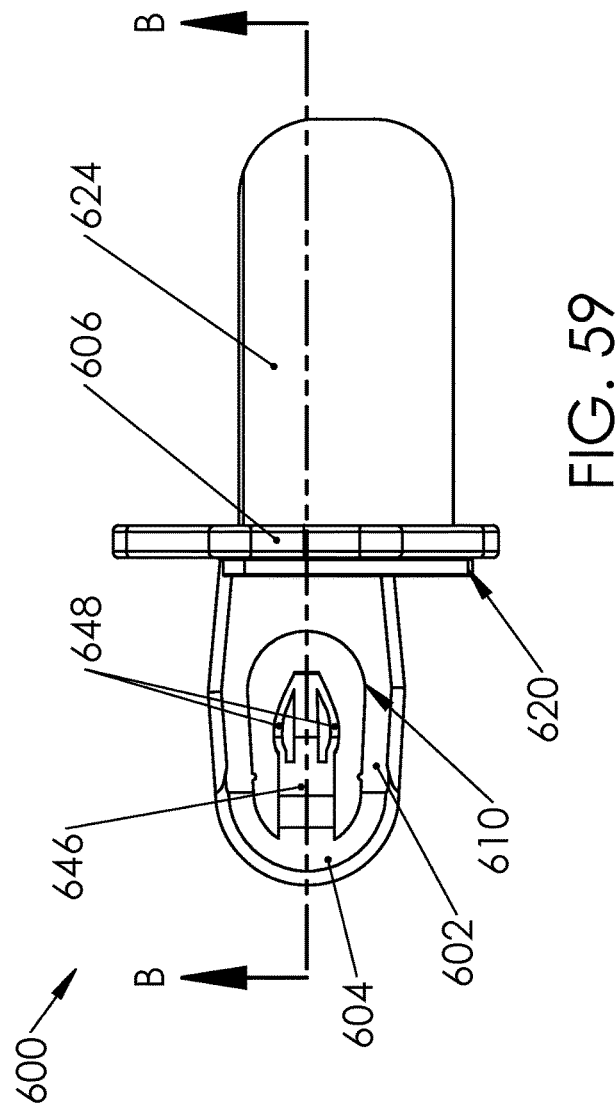

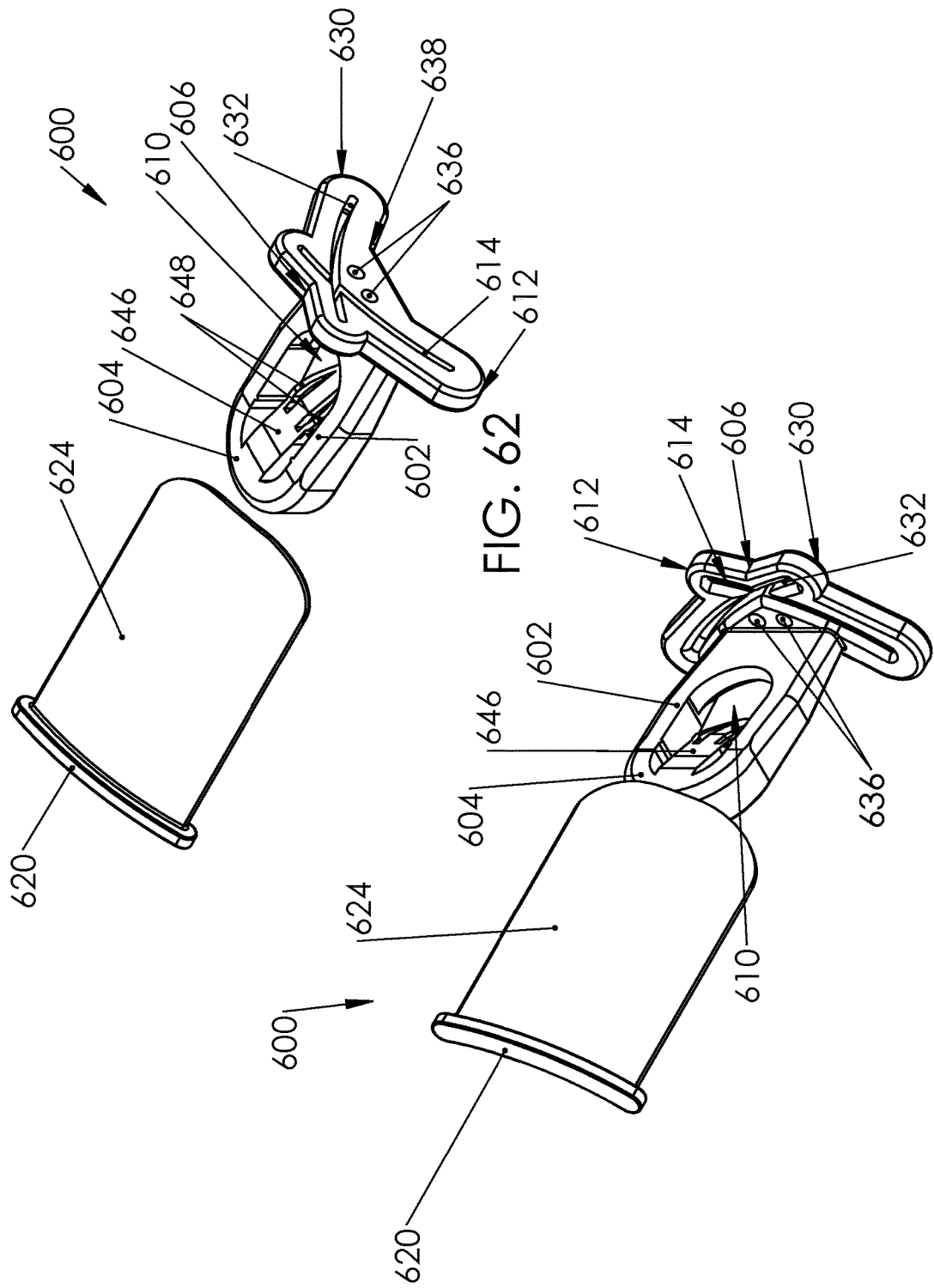

SECTION A-A
SCALE 1 : 1.5

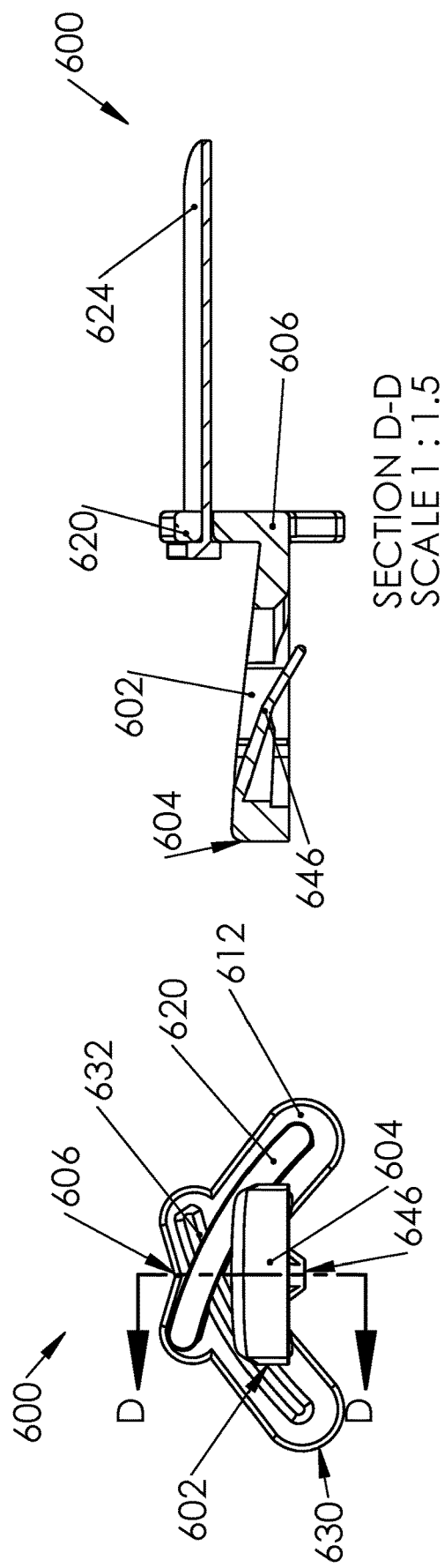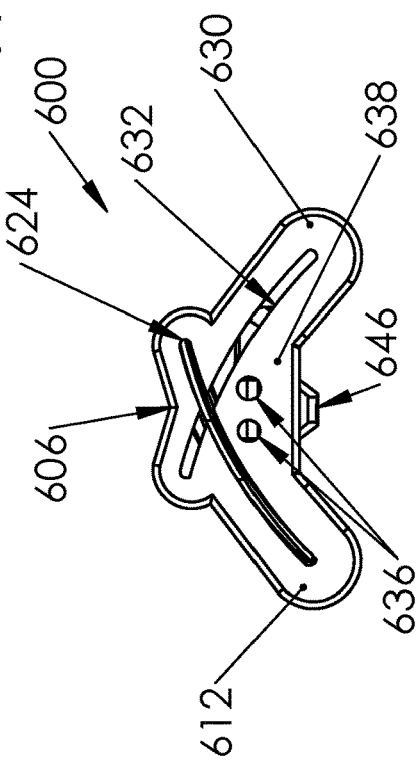

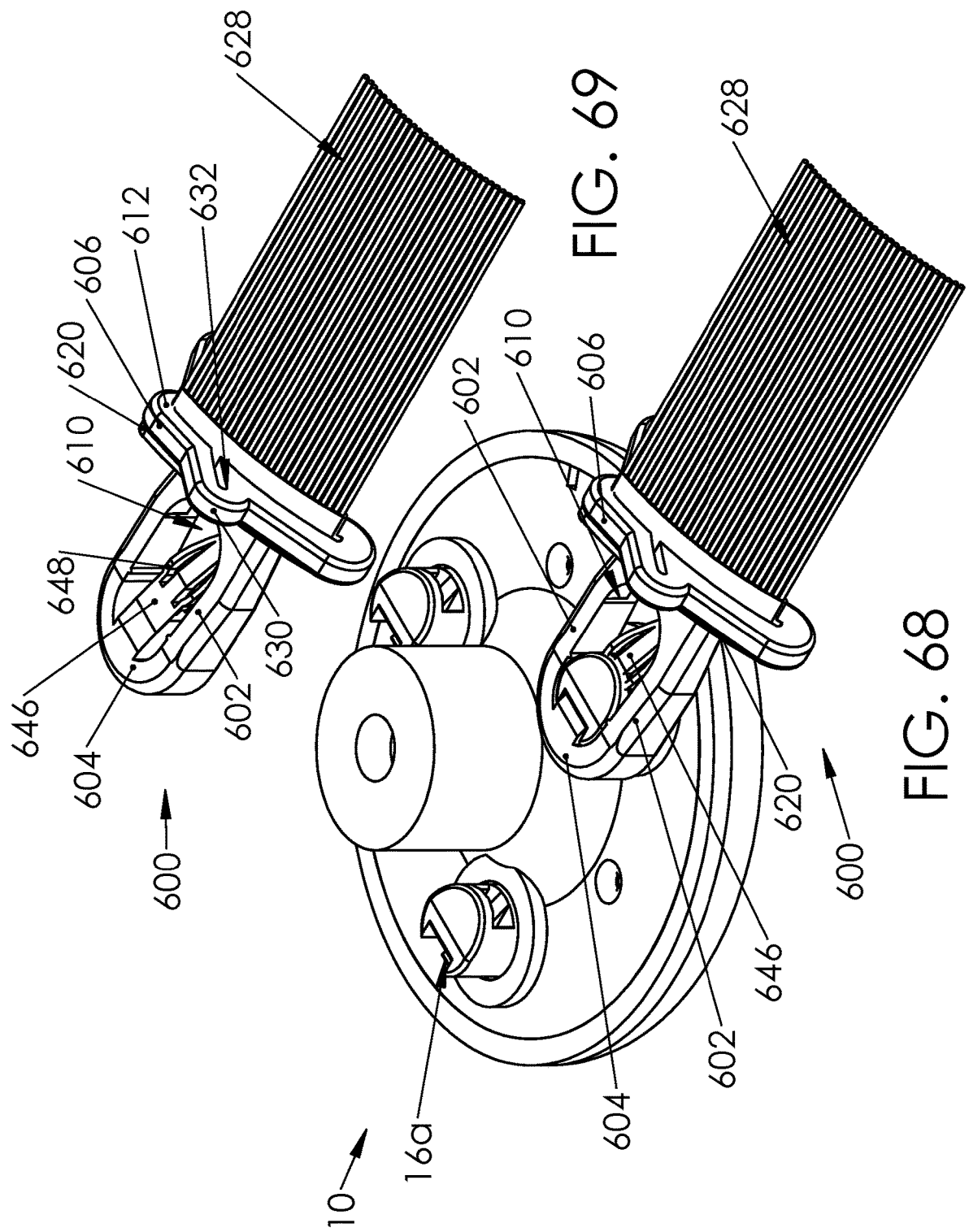

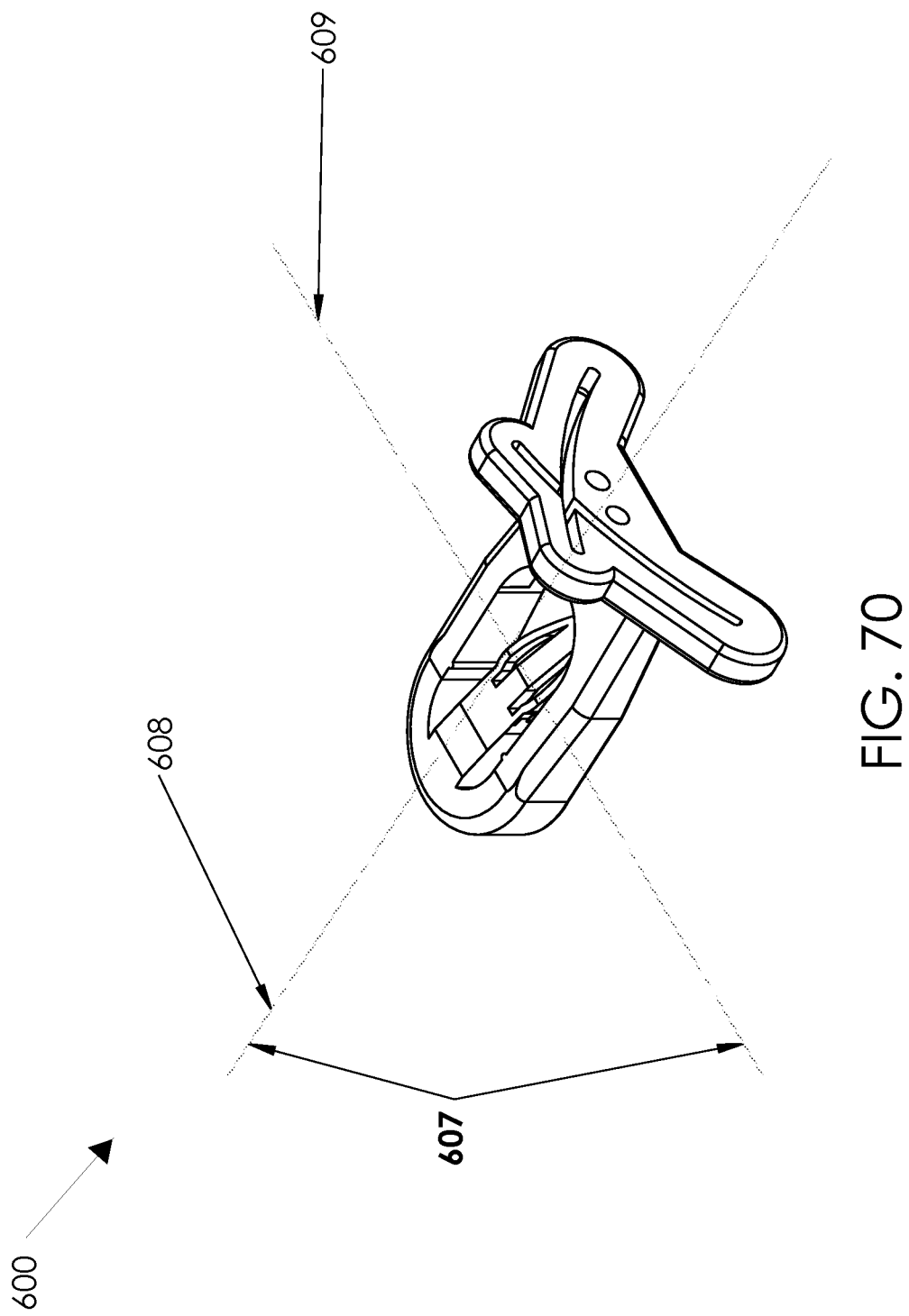

BLADES, PLUGS AND MULTI-TOOL CONNECTORS FOR USE WITH ROTARY HEAD ASSEMBLY

CROSS-REFERENCE TO RELATED APPLICATIONS

This application is a continuation-in-part of U.S. patent application Ser. No. 14/617,398, filed Feb. 9, 2015 now abandoned, which is a continuation-in-part of International Patent Application No. PCT/US2013/053801, filed on Aug. 6, 2013; U.S. patent application Ser. No. 14/617,398, claims the benefit of U.S. Provisional Application No. 62/041,945, filed Aug. 26, 2014; and International Patent Application No. PCT/US2013/053801 claims the benefit of U.S. Provisional Application No. 61/681,304, filed on Aug. 9, 2012. Each patent application identified above is incorporated here by reference in its entirety.

TECHNICAL FIELD

The present disclosure relates to rotary head assembly apparatuses and cutting blades designed for use with rotary head assemblies. More particularly, the present disclosure relates to rotary head assembly apparatuses configured to easily replace cutting members necessary to cut unwanted plants and cutting blades therefor.

BACKGROUND

Presently, there are trimming apparatuses known in the art having a rotatable, attachable head for attachment to a powered device, with the head carrying a series of trimmer lines extending axially out about the periphery of the head. Examples of such weed trimming apparatuses include spool and "bump 'n' feed" weed trimming apparatuses with continuous-feed trimming line, automatic-feed trimmer head, and trimming apparatuses using fixed-length pieces of trimming line or blades. However, such weed trimming apparatuses have certain drawbacks which have gone largely unaddressed in this technical field.

Both the "bump 'n' feed" and automatic trimmer head relies on an internal spool with trimmer line reserves. Stress on these apparatuses' trimming lines will cause it break from time to time during use. Because of their designs, the trimmer lines often get twisted, tangled or buried within the spool making it difficult to dispense the proper line length for cutting. As a result, the trimmer head must then be disassembled, the trimmer string unwound and again rewound in the proper manner before the trimmer head will again work as designed. This process is difficult, labor intensive and highly time consuming.

To address the aforementioned problems of the conventional "bump 'n' feed" and automatic trimmer heads, blades or fixed-length trimmer line pieces have been incorporated into the trimmer head. As the blades become dull or the trimmer lines break, often times, it requires additional tools and/or a lot of time to replace the worn or broken pieces. Thus, a need exists for a rotary apparatus that does not tangle, twist, or bind cutting members such as the trimmer lines. Furthermore, a need exists for a rotary apparatus that does not have to be disassembled to have new strings or other types of cutting members added. Lastly, a need exists for a rotary apparatus which requires little time and effort to replace the cutting members such as trimmer lines or cutting blades. These needs are met by the present invention as described and claimed below.

SUMMARY OF THE INVENTION

From the foregoing, it is apparent there is still a great and long-felt need for a rotary apparatus, in particular a rotary head assembly, that provides quick and easy insertion of a cutting member in order to resume operation as well as simple and efficient removal of the cutting member when replacing it. The present invention addresses the foregoing need, amongst other needs, in a highly unique and facile way. Thus, in one aspect, the present invention provides a novel rotary apparatus, particularly a rotary head assembly from which a cutting member may extend. Particularly, in at least one of its aspects, this invention provides quick and easy insertion of a cutting member in order to resume operation of the rotary apparatus. In another aspect, the invention also facilitates removal of a cutting member during change out, so that there is no need to disassemble the rotary head assembly of the rotary apparatus, as required in other known trimmer apparatuses. The cutting member of the present invention can be flexible (e.g. wires, strands, etc.), semi-rigid (e.g. plastic blades), or rigid (e.g. metal blades) and may be made of any material and in any shape capable of cutting unwanted plants such as weeds. Non-limiting examples of cutting member materials include plastics (e.g. nylon), metals, metal alloys, and combinations thereof.

In one aspect, this invention provides a rotary apparatus comprising a rotary head assembly configured for attachment to a rotary power source, wherein the rotary head assembly has at least one cutting member receptacle wherein said cutting member receptacle optionally rotates or is fixed onto the rotary head assembly, defines at least one cutter inlet and at least one cutter outlet, wherein the cutter inlet is positioned opposite the cutter outlet and sized and configured to receive at least one cutting member and comprises a cutting member retainer wherein the cutting member retainer is positioned in between the cutter inlet and the cutter outlet comprising a channel extending from the cutter inlet forming a ramp surface which is optionally declining or inclining relative to the cutter inlet, so that the cutting member may be inserted into the cutter inlet and engaged with the cutting member retainer and retained by the cutting member receptacle until it is threaded through the cutter outlet.

In another aspect, this invention provides cutting blades sized and configured for easy installation and efficient and effective performance with particular types of trimmer rotary head assemblies. One particular aspect of the invention provides a cutting blade for use with a rotary trimmer head assembly configured with one or more swiveling blade retention members. The blade comprises an elongated body extending along a longitudinal axis, the body forming two opposing planar surfaces and the body comprising a trimmer head connecting end portion and a cutting end portion, the cutting end portion forming at least one cutting edge, and one or more protrusions extending from the trimmer head connecting end portion laterally relative to the longitudinal axis of the elongated body, wherein either (a) one of the planar surfaces forms, at the trimmer head connecting end portion an indentation sized to receive at least one cutting member retainer extending from a component of a trimmer head assembly, or (b) the trimmer head connecting end portion defines an aperture extending through both of the opposing planar surfaces, the aperture being sized to receive at least one cutting member retainer extending from a component of a trimmer head assembly,
so that the blade is detachably coupled to and retained by a respective one of the swiveling blade retention members while the blade extends radially outwardly from the trimmer head assembly during operational rotation of the rotary trimmer head assembly. In one particular aspect of the invention, each of the one or more protrusions forms a laterally extending surface which extends out from the elongated body at the trimmer head connecting end portion, the surface being configured to contact a respective one of the swiveling blade retention members when the cutting member retainer is mated with and received by either the indention of (a) or the aperture of (b) and the blade is urged radially outwardly from the rotary head assembly, e.g., by centrifugal force. The cutting member retainer may be, e.g., in the form of a ramp having a channel-defining edge configured to catch at least a portion of the blade and prevent the blade from moving radially outwardly from the rotary head assembly by, e.g., centrifugal force, when the cutting member retainer is mated with either the indentation of (a) or the aperture of (b), as applicable.

Therefore in accordance with embodiments of the invention, there is provided a cutting blade for use with a rotary trimmer head assembly configured with one or more swiveling blade female receptacles. The blade includes an elongated body extending along a longitudinal axis, the body forming two opposing planar surfaces and the body having a trimmer head connecting end portion and a cutting end portion. The connecting end portion defines a blade mount aperture adapted to receive the swiveling blade receptacle. The cutting end portion forms at least one cutting edge. The connecting end portion includes a male plug member disposed within the aperture. The male plug connection member has at least one resilient inwardly deformable spring arm shaped so as to urge the spring arm inwardly upon insertion of the male plug member into the female receptacle and the spring arm flexes outwardly upon passage through the female receptacle so as to retain the male plug connection member from being inadvertently urged through the female receptacle.

In one embodiment, the male plug connection member includes an opposing pair of spring arms shaped so as to urge the spring arms inwardly upon insertion of the male plug member into the female receptacle. The spring arms flex outwardly upon passage through the female receptacle so as to retain the male plug connection member from being inadvertently urged through the female receptacle.

In another embodiment, the cutting end portion forms two opposed cutting edges.

In a preferred embodiment, there is provided a tool attachment for use with a rotary trimmer head assembly configured with one or more swiveling female receptacles. Preferably, the tool attachment has a planar body defining a tool mount aperture adapted to receive the swiveling female receptacle. The planar body has a connecting end and a tool end. The connecting end has the tool mount aperture, and the tool end has a tool member. In such preferred embodiment, a male tongue member is disposed within the tool mount aperture of the connecting end. The male tongue member has a proximal end and a distal end. The proximal end is fixed within the tool mount aperture and the distal end is fixed to the connecting end. A pair of resiliently flexible spring arms are attached to the distal end of the male tongue member. Wherein the spring arms are shaped to be couplable with the female receptacle. The spring arms compress inwardly upon insertion of the tongue member through the female receptacle. The spring arms then expand outwardly upon traverse of the female receptacle so as to maintain the male tongue member within the female receptacle while the spring arms abut the female receptacle.

In one embodiment, the tool member is a fixed cutting blade.

In another embodiment, the tool member is a fixed blower blade.

In yet another embodiment, the tool member is a fixed propeller.

In one embodiment, the tool member comprises a tool retention end adapted to receive at least one removable tool member. The tool retention end has a first retention arm intersecting a second retention arm. In such embodiment, each intersecting retention arm defines a respective retention slot adapted to slidingly receive and retain the at least one removable tool member.

In another embodiment, the at least one removable tool member has a flange at one end of the removable tool member. The flange has a size larger than the retention slot for preventing the removable tool member from releasing out of the slot during operation of the rotary trimmer head.

In yet another embodiment, the at least one removable tool member is a removable blower blade.

In one embodiment, the at least one removable tool member is a removable broom.

In another embodiment, the tool retention end defines two, spaced but adjacent, parallel trimmer line retention holes with the material between each of the two holes serving as a central member about which a respective, bent back, flexible trimmer line is adapted to be received and retained with a central crook of the bent back trimmer line being wrapped around the central member such that the distal ends of the trimmer line extend completely through the retention holes with each distal end of the trimmer line extending out of and past each respective retention hole.

In accordance with embodiments of the invention, there is provided a trimmer member receptacle configured for use with a rotary trimmer head assembly. The trimmer member receptacle has a cylindrical body having an upper portion opposite a lower portion. The upper portion of the cylindrical body defines a passage therethrough. The passage is defined by a top wall, a bottom wall and a pair of opposing side walls connecting the top and bottom walls. The lower portion of the cylindrical body has a cylindrical flange configured for attachment to the rotary trimmer head assembly.

In accordance with embodiments of the invention, there is provided a multitool retention device for use with a rotary trimmer head assembly configured with one or more receptacles. The multitool retention device has a connection frame having a trimmer head connecting end opposite a tool retention end. The connecting end has a substantially horizontal plane and the connecting end defines a mount aperture adapted to receive the receptacle. The tool retention end has at least one tool retention arm defining an elongated retention slot having a plane that intersects the horizontal plane of the connecting end. The elongated retention slot is configured to slidingly receive and retain at least one planar tool member. The planar tool member has a flange at one end of the tool member having a size larger than the elongated retention slot for preventing the tool from releasing out of the elongated slot during operation of the rotary trimmer head. The tool retention end preferably includes a flanged arm having a plane perpendicular to the horizontal plane wherein the flanged arm defines a tool retention slot.

In one embodiment, the flanged arm is bowed.

In one embodiment, the multitool retention device has at least one second tool retention arm defining a respective second elongated retention slot having a plane that intersects the horizontal plane of the connecting end. The elongated slot is configured to slidingly receive and retain at least one planar tool member comprising a flange at one end of the tool member having a size larger than the elongated retention slot for preventing the tool from releasing out of the elongated slot during operation of the rotary trimmer head.

In another embodiment, the elongated retention slot of the at least one tool retention arm intersects the elongated retention slot of the at least one second tool retention arm.

In yet another embodiment, the plane of the at least one elongated retention slot of the at least one tool retention arm intersects the plane of the at least one elongated retention slot of the at least one second tool retention arm.

In one embodiment, the tool of the multitool retention device is a blade.

In another embodiment, the tool of the multitool retention device is a broom.

In yet another embodiment, the tool retention arm further defines two, spaced but adjacent, parallel trimmer line retention holes with the material between each of the two holes serving as a central member about which a respective, bent back, flexible trimmer line is adapted to be received and retained. A central crook of the bent back trimmer line wraps around the central member such that distal ends of the trimmer line extend completely through the retention holes with each distal end of the trimmer line extending out of and past each respective retention hole.

In one embodiment, the plane of the elongated slot is arcuate.

In another embodiment, the connecting end of the multitool retention device has a male plug connection member disposed within the mount aperture. The male plug connection member has at least one resilient inwardly deformable spring arm. The at least one spring arm is shaped so as to urge the spring arm inwardly upon insertion of the male plug member into the receptacle. The spring arm flexes outwardly upon passage through the receptacle so as to retain the male plug connection member from being inadvertently urged through the receptacle.

In another preferred embodiment, there is presented a multitool retention device for use with a rotary trimmer head assembly configured with one or more receptacles. Preferably, the multitool retention device has a connection frame having a trimmer head connecting end opposite a tool retention end. The connecting end has a substantially horizontal plane and the connecting end defines a mount aperture adapted to receive the receptacle. The tool retention end has a first retention arm intersecting a second retention arm, each intersecting retention arm defines a respective retention slot adapted to slidingly receive and retain at least one blower blade or broom member. When the at least one blower blade or broom member is disposed within the elongated slot of the first retention arm the at least one blower blade or broom member directs air flow away from the rotary trimmer head assembly when the rotary trimmer head is rotating clockwise. When the at least one blower blade or broom member is disposed within the elongated slot of the second retention arm the at least one blower blade or broom member directs air flow toward the rotary trimmer head assembly when the rotary trimmer head is rotating counterclockwise.

In one embodiment, the tool retention end defines two, spaced but adjacent, parallel trimmer line retention holes with the material between each of the two holes serving as a central member about which a respective, bent back, flexible trimmer line is adapted to be received and retained. A central crook of the bent back trimmer line wraps around the central member such that distal ends of the trimmer line extend completely through the retention holes. Each distal end of the trimmer line extends out of and past each respective retention hole.

In another embodiment, the connecting end comprises a male plug connection member disposed within the mount aperture. The male plug connection member has at least one resilient inwardly deformable spring arm. The at least one spring arm is shaped so as to urge the spring arm inwardly upon insertion of the male plug member into the receptacle. The spring arm flexes outwardly upon passage through the receptacle so as to retain the male plug connection member from being inadvertently urged through the receptacle.

These and other features, aspects and advantages of this invention will be still further apparent from the ensuing description, drawings, and appended claims.

BRIEF DESCRIPTION OF THE DRAWINGS

FIG. 5 are perspective views and a cross-sectional view of the cutting member receptacle.

FIG. 5a are exemplary embodiments of the cutting member retainer.

FIG. 6 is a perspective view of the rotary head assembly, the cutting member receptacle, and the cutting members consistent with one aspect of the present invention.

FIG. 6a are perspective views and a cross-sectional view of the cutting member receptacle included in FIG. 6.

FIG. 10A is a side view of a cutting blade according to one embodiment of the invention.

FIG. 10B is a top plan view of the device of FIG. 10A.

FIG. 10C is a cross-sectional view of the device of FIG. 10A, cut along line A-A.

FIG. 10D is a view in perspective of the device of FIG. 10A, from above the device.

FIG. 10E is a view in perspective of the device of FIG. 10A, from below the device.

FIG. 11A is a side view of a cutting blade according to another embodiment of the invention.

FIG. 11B is a top plan view of the device of FIG. 11A.

FIG. 11C is a cross-sectional view of the device of FIG. 11B, cut along line B-B.

FIG. 11D is a view in perspective of the device of FIG. 11A, from above the device.

FIG. 11E is a view in perspective of the device of FIG. 11A, from below the device.

FIG. 12A is a side view of a cutting blade according to yet another embodiment of the invention.

FIG. 12B is a top plan view of the device of FIG. 12A.

FIG. 12C is a cross-sectional view of the device of FIG. 12B, cut along line A-A.

FIG. 12D is a view in perspective of the device of FIG. 12A, from above the device.

FIG. 12E is a view in perspective of the device of FIG. 12A, from below the device.

FIG. 13A is a side view of a cutting blade according to yet another embodiment of the invention.

FIG. 13B is a top plan view of the device of FIG. 13A.

FIG. 13C is a cross-sectional view of the device of FIG. 13B, cut along line B-B.

FIG. 13D is a view in perspective of the device of FIG. 13A, from above the device.

FIG. 13E is a view in perspective of the device of FIG. 13A, from below the device.

FIG. 14 is a top front left perspective view of an exemplary cutting blade attached to a rotary trimmer head assembly configured with one or more swiveling blade female receptacles, according to embodiments of the invention;

FIG. 15 is a top left side perspective view of an exemplary cutting blade, in accordance with embodiments of the invention;

FIG. 16 is a top left side perspective view thereof;

FIG. 17 is a back bottom right perspective view thereof;

FIG. 18 is a top back right perspective view thereof;

FIG. 19 is a front bottom left perspective view thereof;

FIG. 20 is a top left side perspective view of an exemplary cutting blade attached to a swiveling blade female receptacle, in accordance with embodiments of the invention;

FIG. 21 is a bottom view thereof;

FIG. 22 is a side elevation view thereof;

FIG. 23 is a back top left perspective view thereof;

FIG. 24 is a front elevation view thereof;

FIG. 27 is a bottom view thereof;

FIG. 28 is a left side elevation view thereof;

FIG. 29 is a top back left perspective view thereof;

FIG. 30 is a top front right perspective view thereof;

FIG. 31 is a bottom back right perspective view thereof;

FIG. 32 is a back elevation view thereof;

FIG. 33 is a front elevation view thereof;

FIG. 34 is a top view thereof;

FIG. 35 is a side view, in cross section, thereof;

FIG. 36 is a side elevation view thereof;

FIG. 37 is a front elevation view, in cross section, thereof;

FIG. 38 is a bottom view thereof;

FIG. 39 is a front elevation view, in cross section, thereof;

FIG. 40 is a top view thereof;

FIG. 41 is a side elevation view, in cross section, thereof;

FIG. 42 is a top view of an exemplary cutting blade attached to a swiveling blade female receptacle, in accordance with embodiments of the invention;

FIG. 43 is a side elevation view, in cross section, thereof;

FIG. 44 is a top front left perspective view of an exemplary tool member attached to a rotary trimmer head assembly configured with one or more swiveling blade female receptacles, according to embodiments of the invention;

FIG. 45 is a top left side perspective view of an exemplary tool member, in accordance with embodiments of the invention;

FIG. 46 is a top front left perspective view of an exemplary tool member attached to a rotary trimmer head assembly configured with one or more swiveling blade female receptacles, according to embodiments of the invention;

FIG. 47 is a top left side perspective view of an exemplary tool member, in accordance with embodiments of the invention;

FIG. 48 is a top front left perspective view of an exemplary tool member attached to a rotary trimmer head assembly configured with one or more swiveling blade female receptacles, according to embodiments of the invention;

FIG. 49 is a top left side perspective view of an exemplary tool member, in accordance with embodiments of the invention;

FIG. 50 is a left side elevation view of an exemplary trimmer member receptacle, in accordance with embodiments of the invention;

FIG. 51 is a right side elevation view thereof;

FIG. 52 is a top back left perspective view thereof;

FIG. 53 is a back elevation view thereof;

FIG. 54 is a front top left side perspective view thereof;

FIG. 59 is a top view thereof;

FIG. 60 is a side elevation view, in cross section, thereof;

FIG. 61 is a top back left perspective view thereof;

FIG. 62 is a top front left perspective view thereof;

FIG. 65 is a front elevation view thereof;

FIG. 66 is a back elevation view thereof;

FIG. 67 is a side elevation view, in cross section, thereof;

FIG. 68 is a top front left perspective view of an exemplary multitool retention device attached to a rotary trimmer head assembly configured with one or more swiveling blade female receptacles, in accordance with embodiments of the invention; and FIG. 69 is a top left side perspective view of an exemplary multitool retention device with a removable tool, in accordance with embodiments of the invention.

FIG. 70 is a top left side perspective view of an exemplary removable tool member attachment, illustrating the horizontal plane of the connecting end, in accordance with embodiments of the invention;

FURTHER DETAILED DESCRIPTION OF THE INVENTION

Illustrative implementations of the invention are described below as they might be employed in the construction and use of a rotary apparatus and related method according to at least one implementation of the present invention. It will be of course appreciated that in the development of such an actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. In the detailed description below, general discussion of alternative steps, configurations, features and/or components may employ reference to numbered components identified in the accompanying figures. However, it should be appreciated that, unless otherwise explicitly noted, such alternative steps, configurations, features and/or components are not necessarily limited to the particular aspect illustrated in the relevant figures, as the use of such number references in this context is merely for the sake of clarity.

Turning now to the Figures, several illustrative aspects of the apparatus of the present invention are shown. Looking now at FIG. 1, an apparatus comprising a rotary head assembly 10 configured for attachment to a rotary power source (not shown) is shown. The rotary power source may be any source capable to provide sufficient rotation to cut unwanted plants such as weeds. Non-limiting examples of the rotary power source includes any gas-powered, electric-powered, or battery-powered motor found on any standard commercial weed trimming device, such as a "weedeater." The rotary head assembly 10 is sized and configured for attachment to such commercially known weed trimming devices through the use of an attachment member such as a clamp, bolt, or threaded screw (not shown) through the central member aperture 12 defined by the central member 14 of the rotary head assembly.

Figure 1:
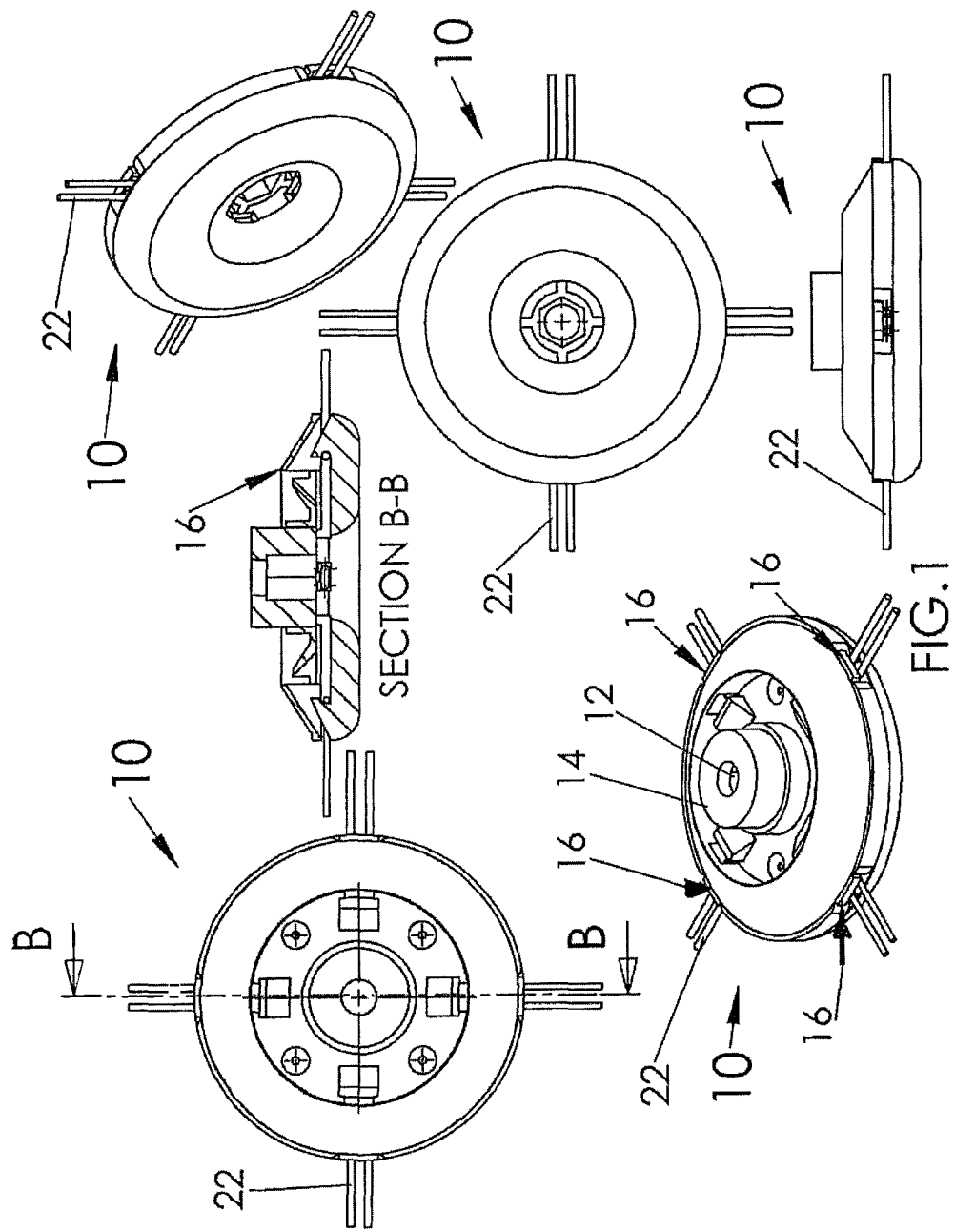
FIG. 1 are perspective views and a cross-sectional view of the rotary head assembly, the cutting member receptacle, and the cutting members consistent with one aspect of the present invention.
Figure 2:
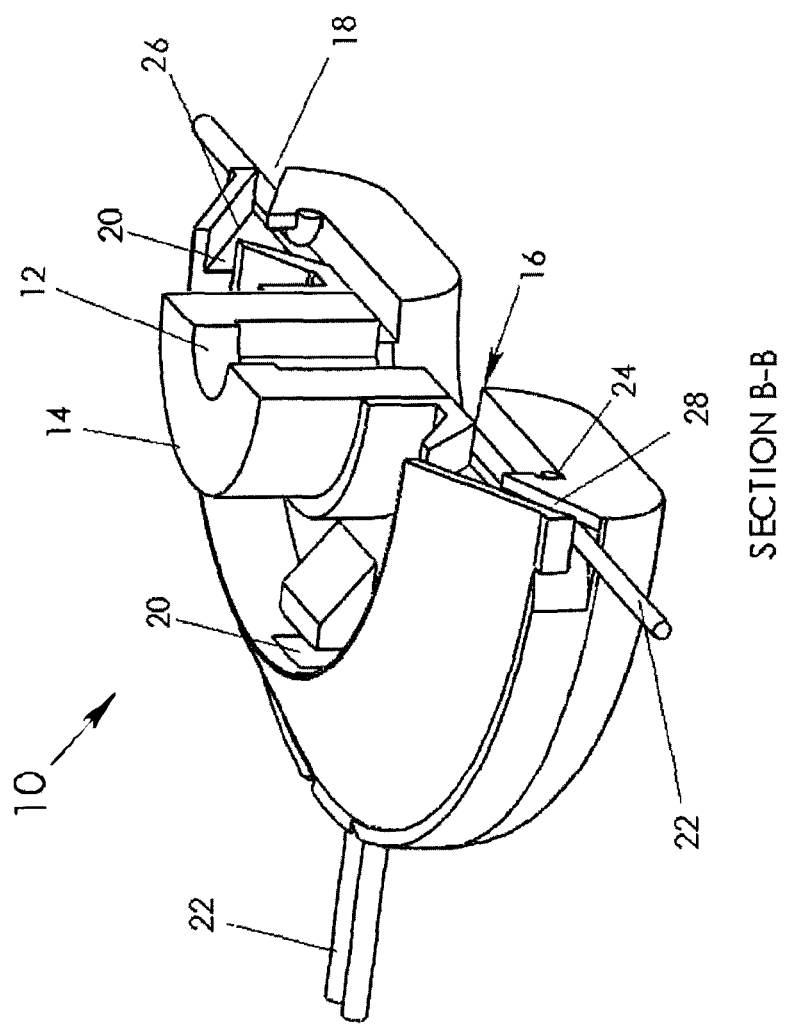
FIG. 2 is a cross-sectional view of the rotary head assembly of FIG. 1.

In one embodiment, the invention comprises the rotary head assembly 10, as illustrated in FIGS. 1 and 2, wherein the rotary head assembly has at least one cutting member receptacle 16 wherein said cutting member receptacle is fixed onto the rotary head assembly 10, defines at least one cutter inlet 18 and at least one cutter outlet 20, wherein the cutter inlet is positioned opposite the cutter outlet and sized and configured to receive at least one cutting member 22 and comprises a cutting member retainer 24 wherein the cutting member retainer is positioned in between the cutter inlet and the cutter outlet comprising a channel 26 extending from the cutter inlet forming a ramp surface 28 which is inclining as shown, but may be optionally configured to be declining, relative to the cutter inlet, so that the cutting member 22 may be inserted into the cutter inlet 18 and engaged with the cutting member retainer 24 and retained by the cutting member receptacle 16 until it is threaded through the cutter outlet 20.

Figure 3:
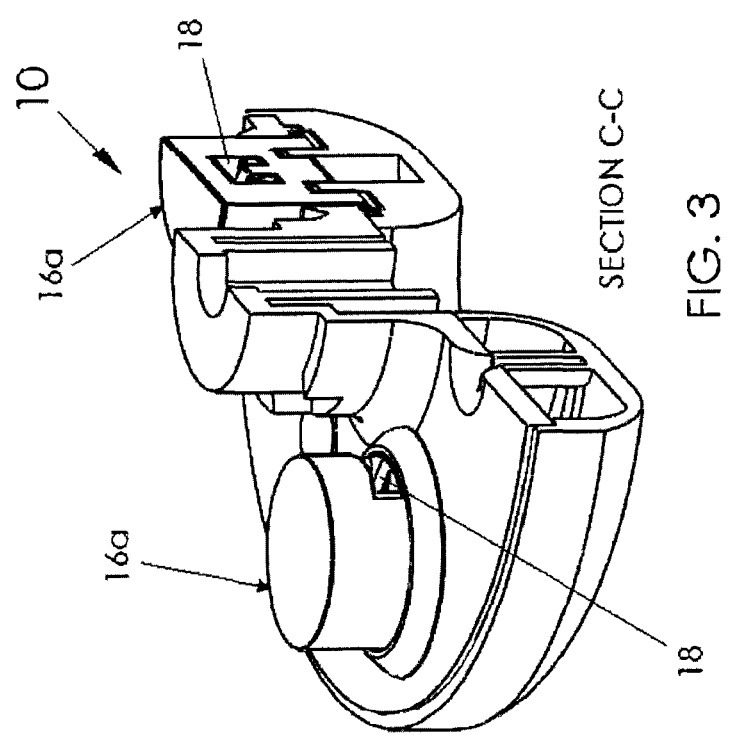
FIG. 3 is a cross-sectional view of the rotary head assembly, the cutting member receptacle consistent with one aspect of the present invention.
Figure 4:
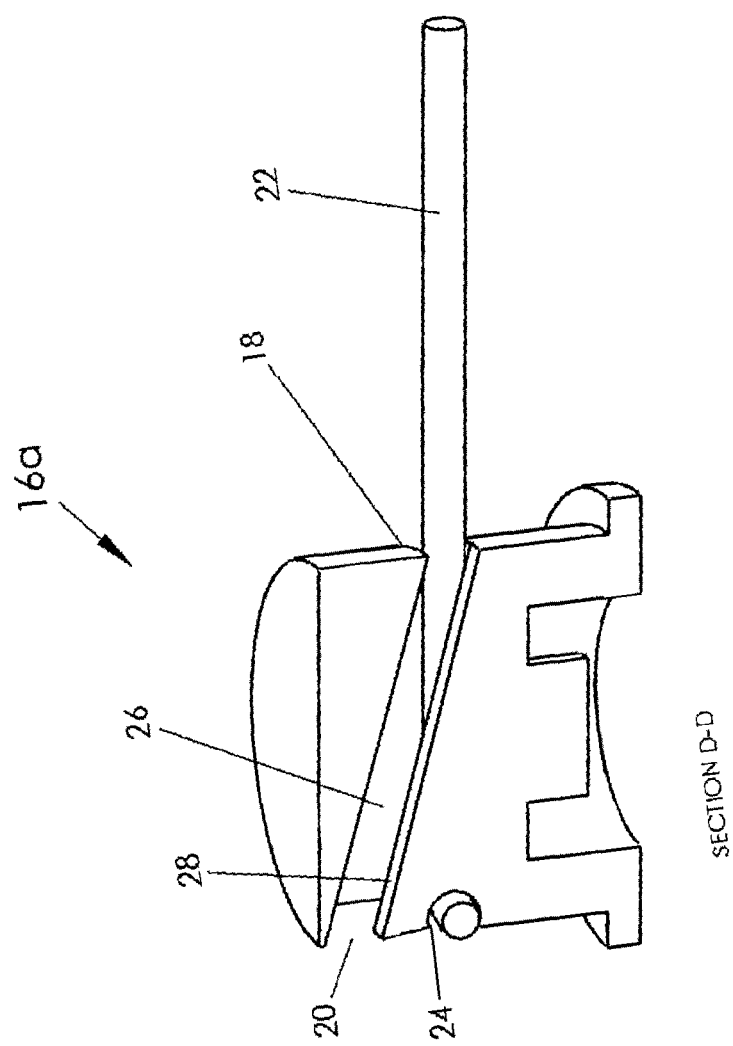
FIG. 4 is a cross-sectional view of the cutting member receptacle included within FIG. 3.

As illustrated in FIGS. 3 and 4, the invention of another embodiment comprises the rotary head assembly 10, defines at least one cutting member receptacle 16a configured to rotate in the same and opposite direction of the rotary head assembly during use, defines at least one cutter inlet 18 and at least one cutter outlet 20, wherein the cutter inlet is positioned opposite the cutter outlet and sized and configured to receive at least one cutting member 22 and comprises a cutting member retainer 24 wherein the cutting member retainer is positioned in between the cutter inlet and the cutter outlet comprising a channel 26 extending from the cutter inlet forming a ramp surface 28 which is inclining as shown, but may be optionally configured to be declining, relative to the cutter inlet, so that the cutting member 22 may be inserted into the cutter inlet 18 and engaged with the cutting member retainer 24 and retained by the cutting member receptacle 16a until it is threaded through the cutter outlet 20.

The cutting member receptacle of the present invention may be spatially arranged in any configuration on, in, or combinations thereof with the rotary head assembly. In another embodiment, the cutting member receptacle may be configured as part of the rotary head assembly or as removable attachments. In yet another embodiment, the rotary head of the present invention may be configured to receive a single cutting member receptacle or a plurality of the cutting member receptacles. In yet a further embodiment, where there are at least two cutting member receptacles, each cutting member receptacle may be spatially arranged in any configuration relative to the other, non-limiting examples include, above, below, opposite, next to, within, or combinations thereof.

As shown in FIG. 5, the cutting member receptacle 16a portion of the present invention may form various shapes and configurations. In one embodiment, one skilled in the art may shape and configure the cutting member receptacle 16a to receive different types of cutting member such as a cutting member shaped like a blade 30, wherein said cutting member of this embodiment has a cutting portion 35 and an attachment portion 40 configured to engage and be retained with the cutting member retainer 24 until the cutter member as exemplified by the blade 30 is threaded through the cutter outlet 20. The cutting member retainer 24 of the present invention may be configured in any form or shape to engage and retain the cutting member when in use. FIG. 5a illustrates various examples of the cutting member retainer embodiments 24a, 24b, 24c, and 24d. In one embodiment, the cutting member retainer 24 may be formed similar to a shape of a portion of the cutting member's exterior and sized to receive it, non-limiting shapes include circular 24a, angular 24b and 24d, rectangular 24c, oval, combinations thereof, or any shape capable of retaining the cutting member. In another embodiment, the cutting member retainer 24 comprises a concave space below the cutter outlet 20.

In one embodiment as illustrated in FIGS. 6 and 6a, a cutting member receptacle 16a configured to receive cutting members 22 such as those that are commercial available such as flexible monofilament plastic trimmer lines of any suitable type and cross-sectional configuration, e.g., 0.065, 0.080, 0.095, 0.105, 0.12, 0.13 or 0.15 gauge nylon trimmer line or the like. Ina further embodiment, the cutting member receptacle 16a configured to receive a cutting member, such as a trimmer line 22 as exemplified in FIG. 6a. In particular, the cutting member receptacle 16a defines at least one cutter inlet 18 and at least one cutter outlet 20, wherein the cutter inlet is positioned opposite the cutter outlet and sized and configured to receive at least one cutting member 22, and comprises a cutter member retainer 24 wherein the cutter member retainer is positioned in between the cutter inlet and the cutter outlet comprising a channel 26 extending from the cutter inlet forming a ramp surface 28 which is declining or inclining relative to the cutter inlet, so that the cutting member 22 may be inserted into the cutter inlet and engaged with the cutter member retainer and retained by the cutter member retainer until it is threaded through the cutter outlet.

Figure 7:
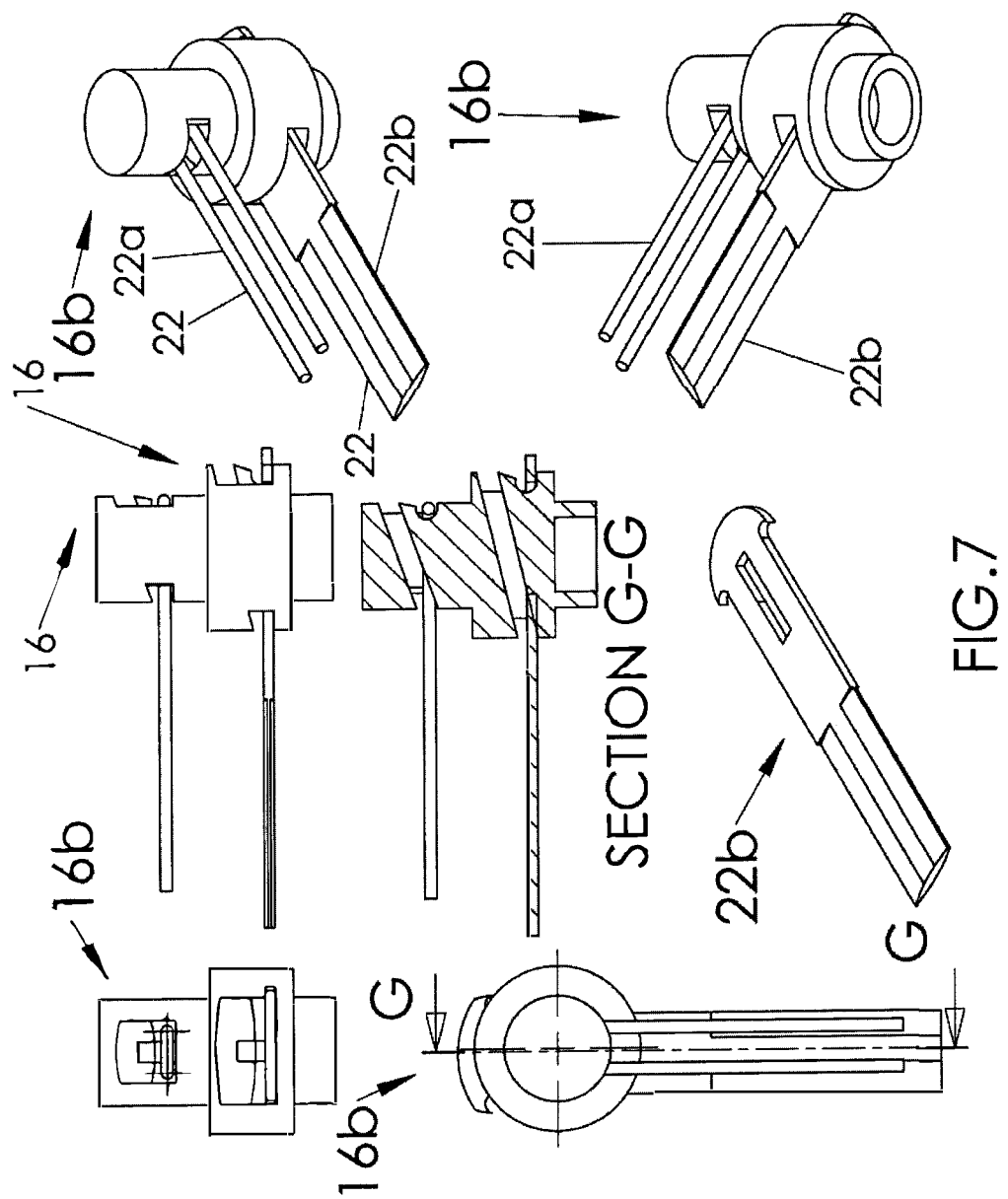
FIG. 7 is a perspective view and a cross-sectional view of the cutting member receptacle.

In another embodiment, as illustrated in FIG. 7, the cutting member receptacle 16b is configured to be on top of another cutting member receptacle. In yet a further embodiment, the rotary apparatus of the present invention may be configured with a singular cutting member or a plurality of cutting members 22, as exemplified in FIG. 7, wherein the cutting members may be the same material, same shape, same texture, different material, different shape, different texture, or combinations thereof from each other. As illustrated in FIG. 7, the cutting member receptacle comprises at least one cutting member 22a which is a flexible trimmer line and at least one cutting member which is a blade-like 22b.

Figure 8:
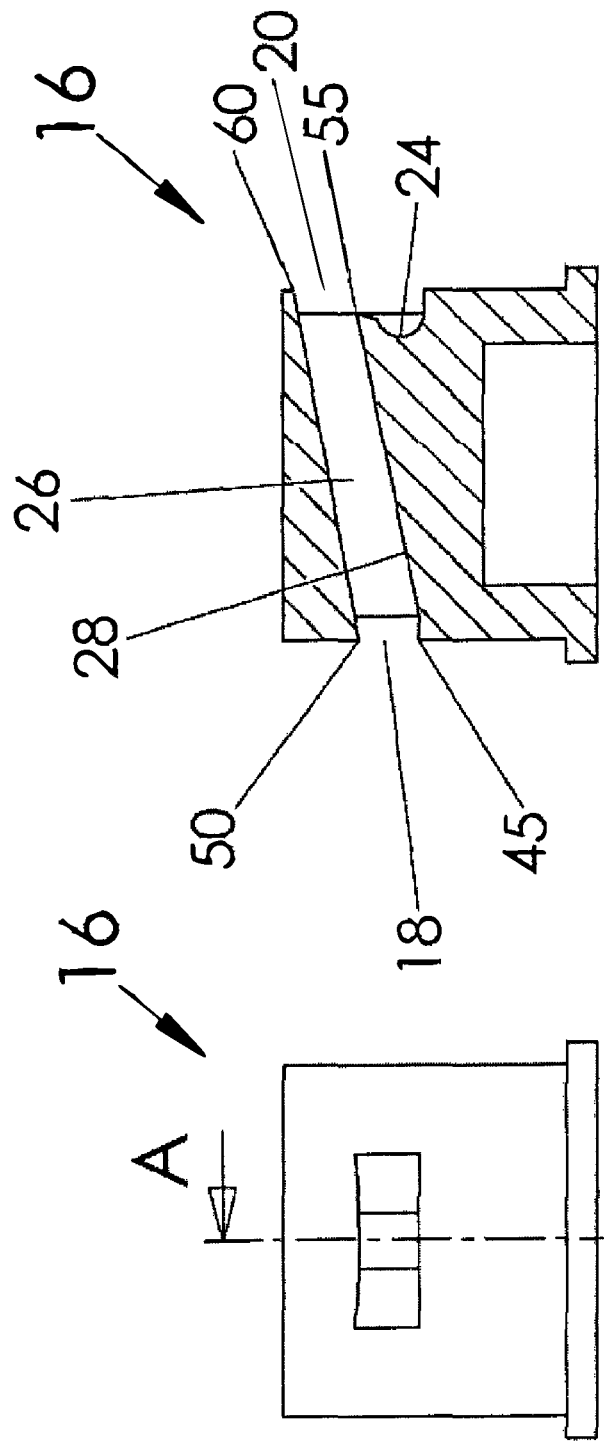
FIG. 8 is a cross-sectional view of the cutting member receptacle.
Figure 9:
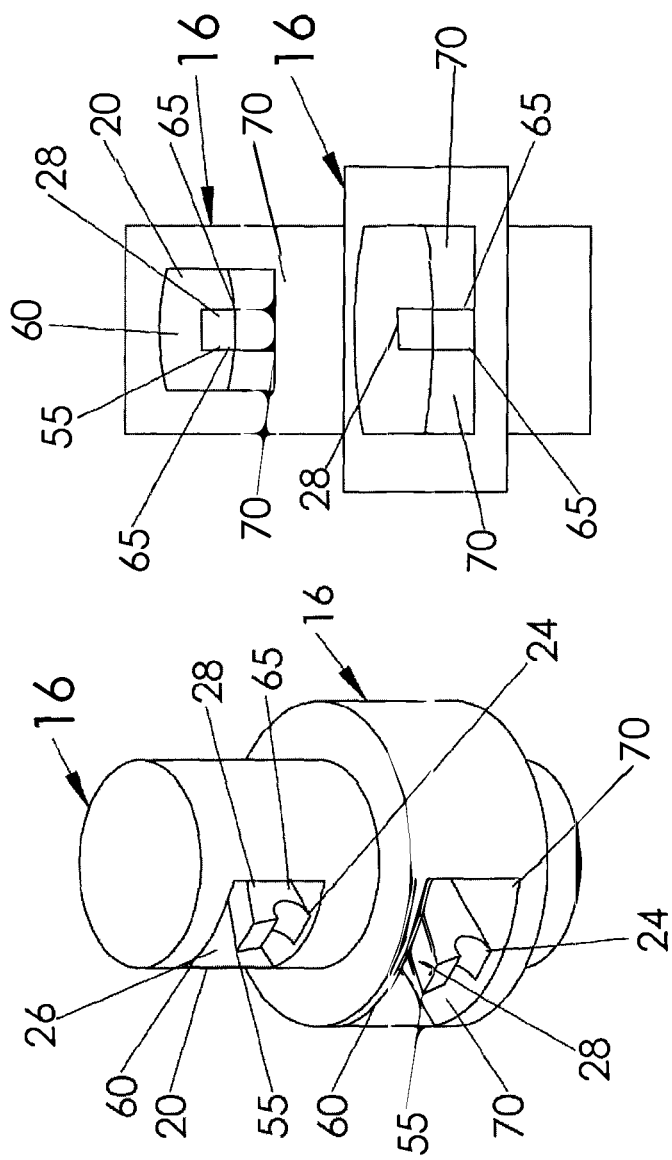
FIG. 9 are perspective views of the cutting member receptacle.
Figure 26:
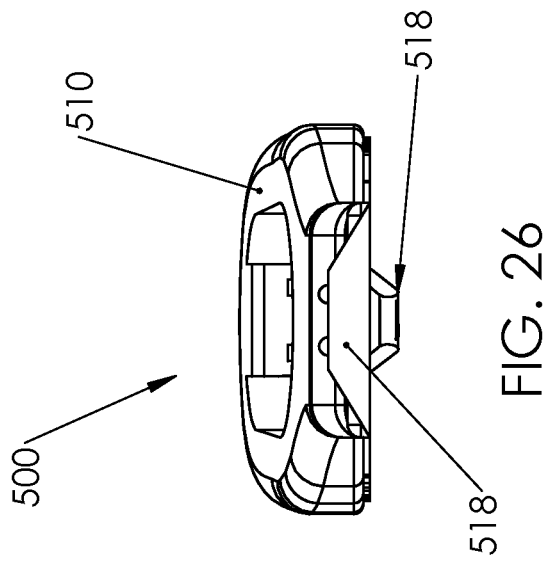
FIG. 26 is a front elevation view thereof.
Figure 25:
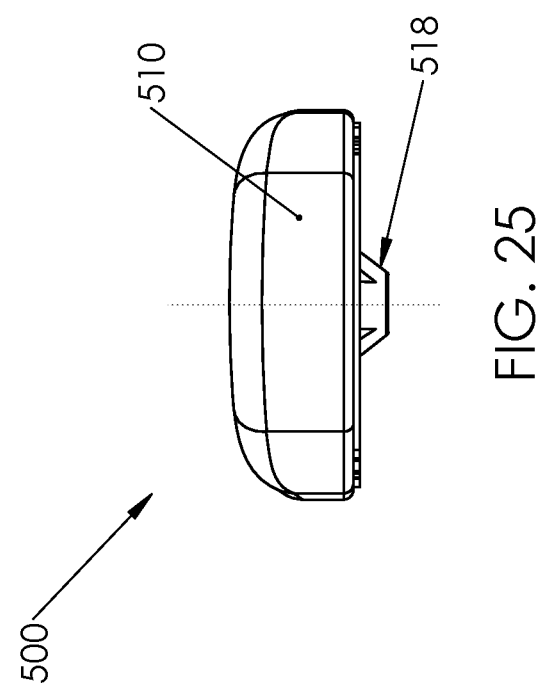
FIG. 25 is a back elevation view of an exemplary cutting blade, in accordance with embodiments of the invention.
Figure 55:
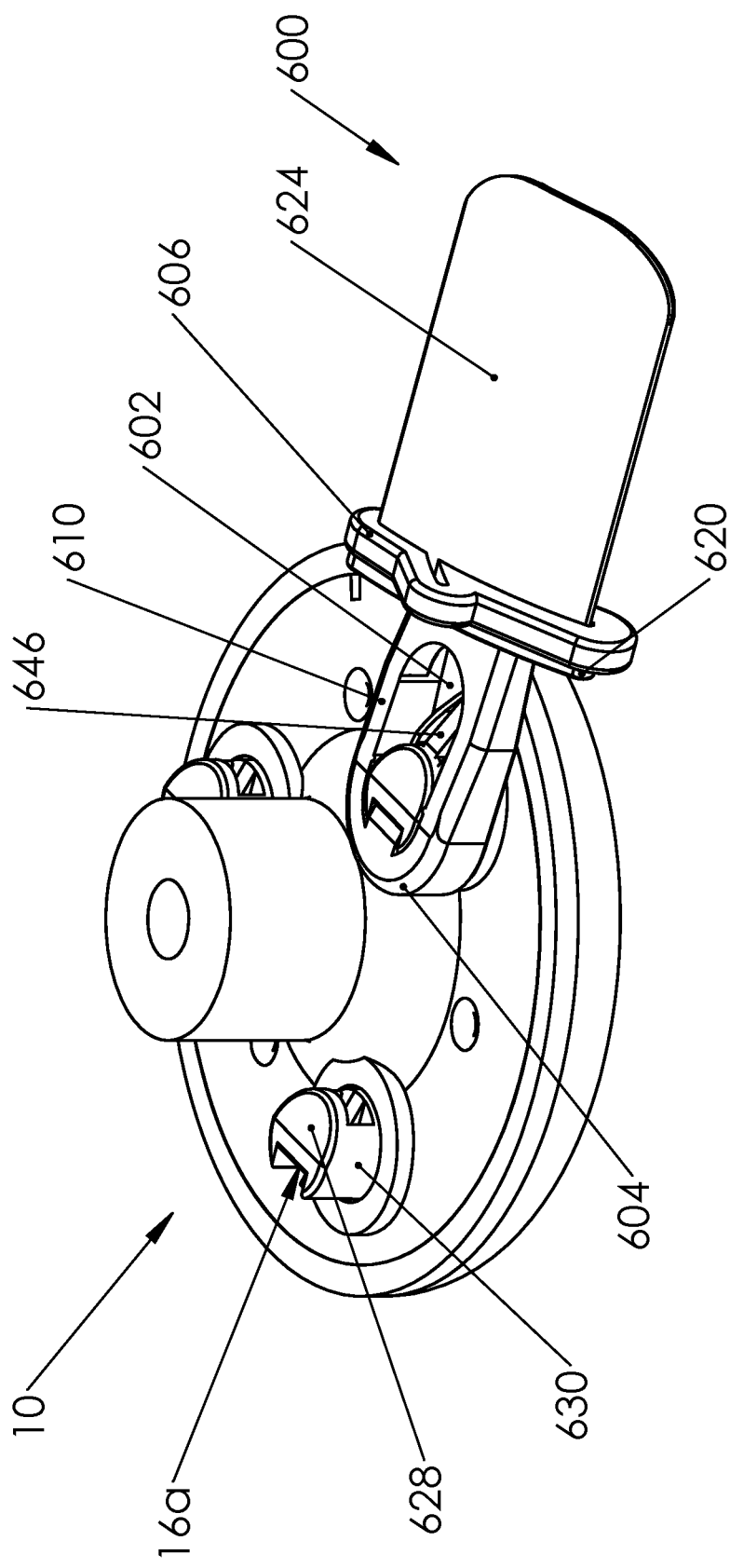
FIG. 55 is a top front left perspective view of an exemplary removable tool member attachment attached to a rotary trimmer head assembly configured with one or more swiveling blade female receptacles, according to embodiments of the invention.

In one aspect of the invention as exemplified in FIGS. 8 and 9, the cutting member receptacle 16 comprises a channel 26 comprising of a lower channel opening 45, an upper channel opening 50, a lower channel outlet 55 and an upper channel outlet 60. The distance between the lower channel opening 45 and the upper channel opening 50 is configured to receive the cutting member of choice when inserted through the cutter inlet 18 and the distance between the lower channel outlet 55 and the upper channel outlet 60 is configured to thread the cutting member of choice through the cutter outlet 20. In another embodiment, the distance between the lower channel opening 45 and the upper channel opening 50 is configured to retain the cutting member when the rotary head is in use. In yet another embodiment, the distance between the lower channel outlet 55 and the upper channel outlet 60 is configured to retain the cutting member when the rotary head is in use. The distance between the lower channel opening 45 and the upper channel opening 50 may be the same or different as the distance between the lower channel outlet 55 and the upper channel outlet 60. In a preferred embodiment, the distance between the lower channel opening 45 and the upper channel opening 50 is the same as the distance between the lower channel outlet 55 and the upper channel outlet 60. In another preferred embodiment, the distance between the lower channel opening 45 and the upper channel opening 50 is configured relative to the distance between the lower channel outlet 55 and the upper channel outlet 60 to secure the cutting member when in use and easily removed when threaded through the cutter outlet 20.

In yet another aspect of the invention, the lower channel opening 45 and lower channel outlet 55 are configured relative to one another forming a ramp 28 for receiving a cutting member, wherein the ramp may be optionally inclining or declining relative to the cutter inlet 18. One skilled in the art may configure the ramp with respect to the embodiments of the present invention at any angle relative to the cutter inlet 18. In one embodiment on an imaginary axis, when the lower channel opening 45 is positioned lower than the lower channel outlet 55, a ramp 28 configured to incline relative to the cutter inlet 18 is formed as exemplified in FIG. 8. In another embodiment on an imaginary axis, when the lower channel opening 45 is positioned higher than the lower channel outlet 55, a ramp configured to decline relative to the cutter inlet 18 is formed. In one embodiment on an imaginary axis, where the ramp is inclining relative to the cutter inlet 18, the upper channel opening 50 is configured to be level or lower than the lower channel outlet 55. In another embodiment on an imaginary axis, where the ramp is declining relative to the cutter inlet 18, the lower channel opening 45 is configured to be level or higher than the upper channel outlet 60. In a preferred embodiment on an imaginary axis, the lower channel opening 45 and the lower channel outlet 55 are positioned to secure the cutting member when in use and easily removed when threaded through the cutter outlet 20 when the rotary head is not in use.

In one embodiment (FIG. 9), a cutting member receptacle 16 configured and positioned on top of another cutting member receptacle 16. In one embodiment, the ramp surface 28 comprises at least two side edges 65. The side edges 65 are configured and sized to define at least two side channels 70 extending from the cutter inlet to the cutter outlet 20 sufficient to receive a cutting member through the cutter inlet and retain the cutting member within the cutting member retainer 24 when in use and release the cutting member when threaded through the cutter outlet 20.

In another aspect of the invention, a cutting blade is provided, the blade having a cutting end portion and an attachment end portion, the attachment end portion being sized and configured to engage with and be retained by a cutting member retainer (also referenced herein as a blade retention member) of the trimmer head assembly. Typically, the retainer component is configured to retain the blade unless and until the blade is threaded through a cutter outlet or otherwise uncoupled from the trimmer head assembly by a manual actuation of the retainer component or a device coupled thereto, so that the blade may be removed through either the cutter outlet or the cutter inlet.

As noted above with reference to FIGS. 5 and 7, one aspect of the invention provides a cutting blade comprising features which work particularly well with trimmer head assemblies described herein in which a swiveling component in the form of a swiveling blade retention member which defines the cutting member retainer and swivels relative to the rest of the trimmer head. In this way, the blade may be coupled to the trimmer head and yet swivel relative to the trimmer head. One example of such a swiveling component which can be adapted to receive the blades of this aspect of the invention is commercially available and sold as a PIVOTRIM™ trimmer head assembly by Better-Heads, LLC of Pearland, Tex. The blades herein described are particularly well-suited to a pivoting connection to the trimmer head assembly, because the pivoting action prevents damage to the blades during operative rotation of the trimmer head and blades and contact with the target material to be cut and/or surrounding objects. Thus, blades illustrated in FIGS. 5 and 7, as well as alternative configurations in FIGS. 10A-10E, 11A-11E, 12A-12E and 13A-13E, feature the aforesaid advantages. Each of these blades features an attachment end portion which defines an aperture or indentation through which a cutting member retainer component of the trimmer head assembly may be disposed to couple the blade to the trimmer head assembly and retain the blade so that it will not unintentionally separate (e.g., radially outwardly) from the trimmer head during operative rotation, e.g., due to centrifugal forces applicable during normal use of the associated trimmer. Some of these blades provide additional structural features which further protect against unintended disconnection of the blade from the trimmer head assembly during normal rotational operation.

Turning to FIGS. 10A-10E, different views of a cutting blade in accordance with one aspect of this invention are illustrated. The blade 100 comprises an elongated body 110 forming two opposing surfaces 112 and 113 and comprising a trimmer head connecting end portion 114 and a cutting end portion 115. The blade forms two opposing blunt cutting edges 116 and 118, and body 110 defines an elongated, rectangular aperture 119 extending therethrough. A cutter retention member, such as, member 24 of FIG. 8, may extend into aperture 119 when blade 100 is disposed over and around retention member 24 and coupled thereby to the trimmer head assembly. Preferably, blade 100 and retention member 24 when mated to one another swivel relative to the trimmer head assembly, as noted previously.

FIGS. 11A-11E illustrate another blade in accordance with an alternative aspect of the invention. A blade 200 comprises an elongated body 210 forming two opposing surfaces 212 and 213 and comprising a trimmer head connecting end portion 214 and a cutting end portion 215. The blade forms two opposed cutting edges 216 and 218, and body 210 forms and defines an elongated, rectangular indentation 219. Indentation 219 is sized to receive at least one cutting member retainer extending from a component of a trimmer head assembly. Blade 200 further comprises two opposed protrusions 214a and 214b extending from trimmer head connecting end portion 214 laterally relative to the longitudinal axis of elongated body 210. In this way, the blade is detachably coupled to and retained by a respective one of the swiveling blade retention members while the blade extends radially outwardly from the trimmer head assembly during operational rotation of the rotary trimmer head assembly. Each of the protrusions 214a and 214b forms a laterally extending arcuate surface 214c and 214d, respectively, each of which extends out from elongated body 210 at trimmer head connecting end portion 214. These surfaces are configured to contact a swiveling blade retention member when the cutting member retainer is mated with and received by the indentation and the blade is urged radially outwardly from the rotary head assembly, e.g., by centrifugal force. As noted before, the cutting member retainer may be, e.g., in the form of a ramp having a channel-defining edge configured to catch at least a portion of the blade and prevent the blade from moving radially outwardly from the rotary head assembly by, e.g., centrifugal force, when the cutting member retainer is mated with indentation 219.

As seen in FIGS. 12A-12E, an alternative aspect of the invention provides a cutting blade 300 comprising an elongated body 310 forming two opposing surfaces 312 and 313 and further comprising a trimmer head connecting end portion 314 and a cutting end portion 315. The blade forms two opposed cutting edges 316 and 318, and body 310 forms and defines an elongated, rectangular aperture 319. Aperture 319 is sized to receive at least one cutting member retainer extending from a component of a trimmer head assembly. Blade 300 further comprises two opposed protrusions 314a and 314b extending from trimmer head connecting end portion 314 laterally relative to the longitudinal axis of elongated body 310. In this way, blade 300 is detachably coupled to and retained by a respective one of the swiveling blade retention members while the blade extends radially outwardly from the trimmer head assembly during operational rotation of the rotary trimmer head assembly. Each of the protrusions 314a and 314b forms a laterally extending arcuate surface 314c and 314d, respectively, each of which extends out from elongated body 310 at trimmer head connecting end portion 314. These surfaces are configured to contact a swiveling blade retention member when the cutting member retainer is mated with and received by the indentation and the blade is urged radially outwardly from the rotary head assembly, e.g., by centrifugal force. As noted before, the cutting member retainer may be, e.g., in the form of a ramp having a channel-defining edge configured to catch at least a portion of the blade and prevent the blade from moving radially outwardly from the rotary head assembly by, e.g., centrifugal force, when the cutting member retainer is mated with aperture 319.

FIGS. 13A-13E illustrate another aspect of the invention which is a blade 400 similar to that of FIGS. 12A-12E, except that it defines an aperture 419 which is smaller and of a different shape from that which is shown in FIGS. 12A-12E, to illustrate one or several alternative configurations which could perform the same function and can be envisioned by one of ordinary skill in the art having the benefit of the rest of this disclosure. Altering the size of the aperture can, in some designs, provide additional strength to the connecting end portion of the blade material, to prevent it from breaking during blade (e.g., cutting end portion) contact with vegetation or surround objects during rotational operation of the trimmer head assembly to which each blade is coupled, in some aspects of the invention preferably so as to swivel relative thereto. In this configuration, the blade retention member may not necessarily be in the form of a ramp, but instead may be a pin or other device extending from a component of the trimmer head assembly so as to engage with aperture 419 to retain the blade in coupled engagement with the trimmer head assembly during normal rotational operation.

In accordance with embodiments of the invention, there is provided a cutting blade 500 for use with a rotary trimmer head assembly 10 configured with one or more swiveling blade female receptacles 16a as illustrated in FIGS. 14-49. As illustrated in FIGS. 17 and 21, the blade 500 preferably includes an elongated body 506 extending along a longitudinal axis 502, and the body 506 forms two opposing planar surfaces 508 and 509. The body 506 preferably has a trimmer head connecting end portion 510 and a cutting end portion 512, as illustrated in FIG. 16. The cutting blade may be the same material, same shape, same texture, different material, different shape, different texture, or combinations thereof from each other.

The connecting end portion 510 preferably defines a blade mount aperture 514 adapted to receive a swiveling blade receptacle 16a, as illustrated in FIGS. 14, 20-24, and 42-43. The cutting end portion 512 forms at least one cutting edge 516, as illustrated in FIG. 20.

The connecting end portion 510 preferably includes a male plug member 518 disposed within the aperture 514 formed by the connecting end portion 510, as illustrated in FIGS. 16-22 and 27-31.

An exemplary cutting blade 500 is illustrated in FIG. 34. FIG. 35 is a cross section along section A-A of FIG. 34. FIGS. 34-35 illustrate the male plug connection member 518 disposed within the blade mount aperture 514 of the cutting blade 500, and as can be seen, the male plug connection member 518 is configured to be inserted into the female swiveling receptacle 16a as illustrated in FIGS. 20-24 and 42-43. FIG. 14 illustrates the male plug connection member 518 inserted into the female swiveling receptacle 16a which is operatively connected to the rotary trimmer head assembly 10.

As illustrated in FIG. 20, the male plug connection member 518 has at least one resilient inwardly deformable spring arm 522 shaped so as to urge the spring arm 522 inwardly upon insertion of the male plug member 518 into the female receptacle 16a. The spring arm 522 flexes outwardly upon passage through the female receptacle 16a so as to retain the male plug connection member 518 from being inadvertently urged through the female receptacle 16a, e.g., by centrifugal force. FIG. 43, which is a cross sectional view along section B-B of FIG. 42, illustrates the male plug connection member 518 of the blade mount aperture 514 inserted into the swiveling blade receptacle 16a and secured by the spring arm 522. This connection provides structural support for the exemplary cutting blade 500 and results in preventing the blade 500 from being inadvertently removed from the rotary trimmer head assembly 10 while in operation, e.g., by centrifugal force.

Referring to the embodiments illustrated in FIGS. 14, 20-23, and 42-43, the male plug connection member 518 includes an opposing pair of spring arms 522 and 523 shaped so as to urge the spring arms 522 and 523 inwardly upon insertion of the male plug member 518 into the female receptacle 16a. The spring arms 522 and 523 flex outwardly upon passage through the female receptacle 16a so as to retain the male plug connection member 518 from being inadvertently urged through the female receptacle 16a, e.g., by centrifugal force. As illustrated in FIG. 43, which is a cross sectional view along the line B-B of FIG. 42, depicting the male plug connection member 518 inserted into the female receptacle 16a thereby retaining the male plug connection member 518 and preventing said member 518 from being urged through the female receptacle 16a.

In another embodiment, the cutting end portion 512 forms two opposed cutting edges 516 and 517, as illustrated in FIGS. 40 and 42. By providing two opposed cutting edges the blade may be utilized within a rotary trimmer head assembly 10 which is spinning either clockwise or counterclockwise, and therefore increases the product lifespan of the blades 500.

In a preferred embodiment, there is provided a tool attachment 500 for use with a rotary trimmer head assembly 10 configured with one or more swiveling female receptacles 16a as illustrated in FIGS. 14-49. Preferably, as illustrated in FIGS. 17 and 21, the tool attachment 500 has a planar body 506 defining a tool mount aperture 514 adapted to receive the swiveling female receptacle 16a, as shown in FIGS. 14-49. The planar body 506 has a connecting end 510 and a tool end 512. The connecting end 510 has the tool mount aperture 514, and the tool end 512 has a tool member 542. In such preferred embodiment, a male tongue member 518 is disposed within the tool mount aperture 514 of the connecting end 510, as illustrated in FIGS. 16-22 and 27-31. The male tongue member 518 has a proximal end 544 and a distal end 546. The proximal end 544 is fixed within the tool mount aperture 514 and the distal end 546 is fixed to the connecting end 510. A pair of resiliently flexible spring arms 520 are attached to the distal end 546 of the male tongue member 518, as illustrated in FIGS. 15 and 34. Spring arms 520 are preferably shaped to be couplable with the female receptacle 16a. The spring arms 520 compress inwardly upon insertion of the tongue member 518 through the female receptacle 16a. The spring arms 520 then expand outwardly upon traverse of the female receptacle 16a so as to maintain the male tongue member 518 within the female receptacle 16a while the spring arms 520 abut the female receptacle 16a, preventing the tool member 542 from being lost during operation, e.g., by centrifugal force.

In one embodiment, the tool member 542 is a fixed cutting blade 552, as shown in FIG. 42.

In another embodiment, as illustrated in FIGS. 44-45, the tool member 542 is a blower blade 548.

In yet another embodiment, the tool member 542 is a propeller 550, as shown in FIGS. 48-49. Use of such embodiment may be applied to a boat, in which the propeller 550 may be used to propel the boat.

In one embodiment, as illustrated in FIGS. 55-75, the tool member 542 has a tool retention end 606 adapted to receive at least one removable tool member 618. The tool retention end 606 has a first retention arm 612 intersecting a second retention arm 630. In such embodiment, each intersecting retention arm 612, 630 defines a respective retention slot 614, 632 adapted to slidingly receive and retain the at least one removable tool member 618, as illustrated in FIGS. 56-59.

In another embodiment, as illustrated in FIGS. 56, 59-64, and 67, the at least one removable tool member 618 has a flange 620 at one end of the removable tool member 618. The flange 620 has a size larger than the retention slot 614, 632 to prevent the removable tool member 618 from releasing out of the slot 614, 632 during operation of the rotary trimmer head 10.

In yet another embodiment, the at least one removable tool member 618 is a removable blower blade 624, as shown in FIGS. 55-64.

In one embodiment, as shown in FIGS. 68-69, the at least one removable tool member 618 is a removable broom 628.

Figure 75:
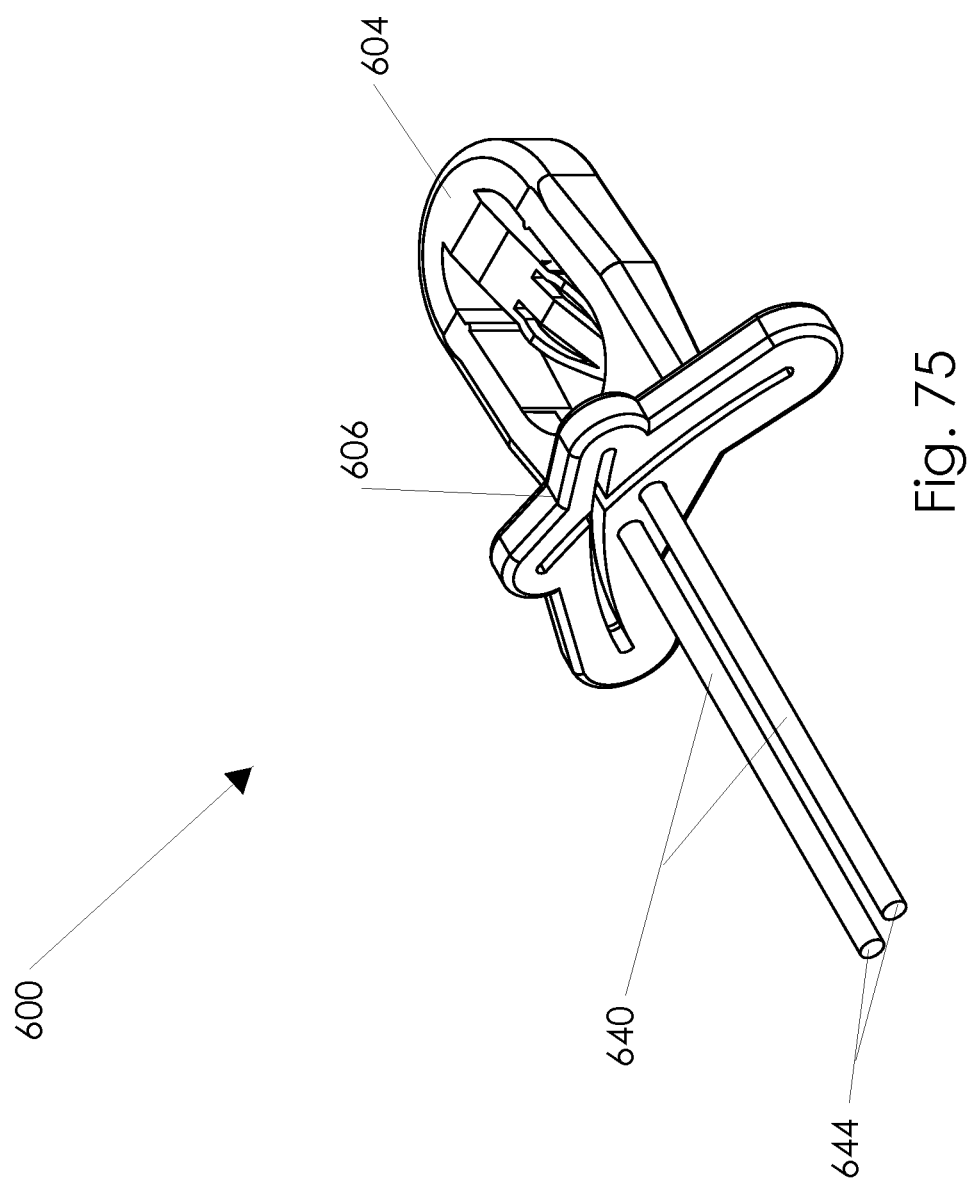
FIG. 75 is a perspective view of an exemplary multitool retention device with an exemplary trimmer line attached thereto, in accordance with embodiments of the invention; and In each of the above figures, like numerals are used to refer to like or functionally like parts among the several figures.

In another embodiment, as illustrated in FIG. 65, the tool retention end 606 defines two, spaced but adjacent, parallel trimmer line retention holes 636 with the material between each of the two holes 636 serves as a central member 638 about which a respective, bent back, flexible trimmer line 640 is adapted to be received and retained with a central crook 642 of the bent back trimmer line 640 being wrapped around the central member 638 such that the distal ends 644 of the trimmer line 640 extend completely through the retention holes 636 with each distal end 644 of the trimmer line 640 extending out of and past each respective retention hole 636, as illustrated in FIG. 75.

In accordance with embodiments of the invention, there is provided a trimmer member receptacle 16a configured for use with a rotary trimmer head assembly 10 as illustrated in FIGS. 50-54. The trimmer member receptacle 16a has a cylindrical body 526 having an upper portion 528 opposite a lower portion 530. The upper portion 528 of the cylindrical body 526 preferably defines a passage 532 therethrough, which is defined by a top wall 534, a bottom wall 536 and a pair of opposing side walls 538 connecting the top wall 534 and bottom wall 536. The lower portion 530 of the cylindrical body 526 has a cylindrical flange 540 configured for attachment to the rotary trimmer head assembly 10. Attachment of the trimmer member receptacle 16a is either fixed or rotatable on the rotary trimmer head assembly 10.

For purposes of clarity and orientation with respect to the invention, it is noted that a plane shall be represented herein by two perpendicular axes. An axial or horizontal plane is an X-Z plane, parallel to the ground. A frontal (also known as coronal) plane is a Y-X plane, perpendicular to the ground, which separates the anterior from the posterior, the front from the back, the ventral from the dorsal. A lateral plane is a Y-Z plane, perpendicular to the ground, which separates left from right. Objects are coplanar if they all lie in the same plane. For example, one axis is coplanar with another axis when the two axes lie in the same plane.

Figure 56:
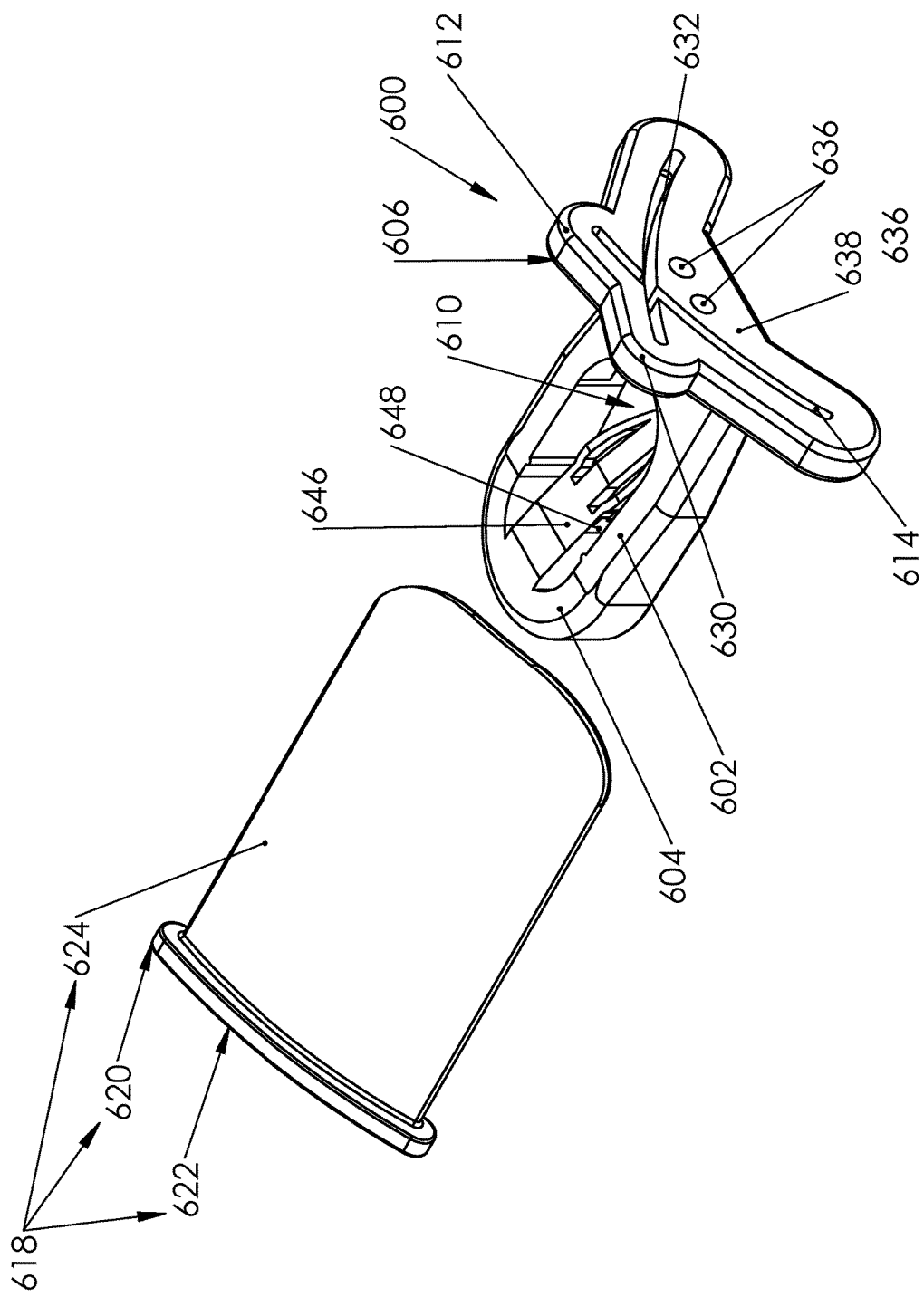
FIG. 56 is a top left side perspective view of an exemplary removable tool member attachment with removable tool, in accordance with an embodiment of the invention.
Figures 57, 58:
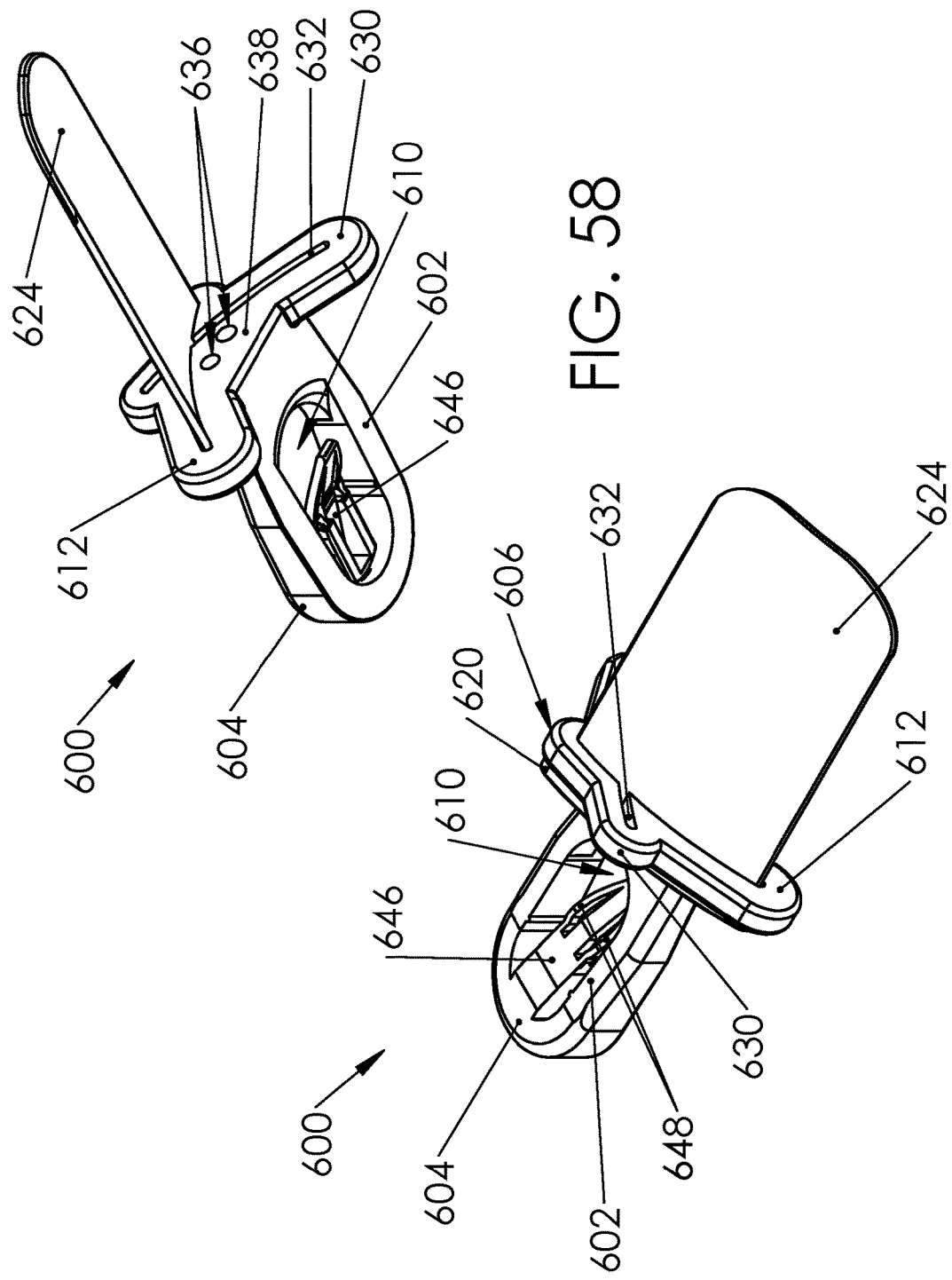
FIG. 57 is a top front left perspective view thereof.
FIG. 58 is a front left bottom perspective view thereof.
Figure 63:
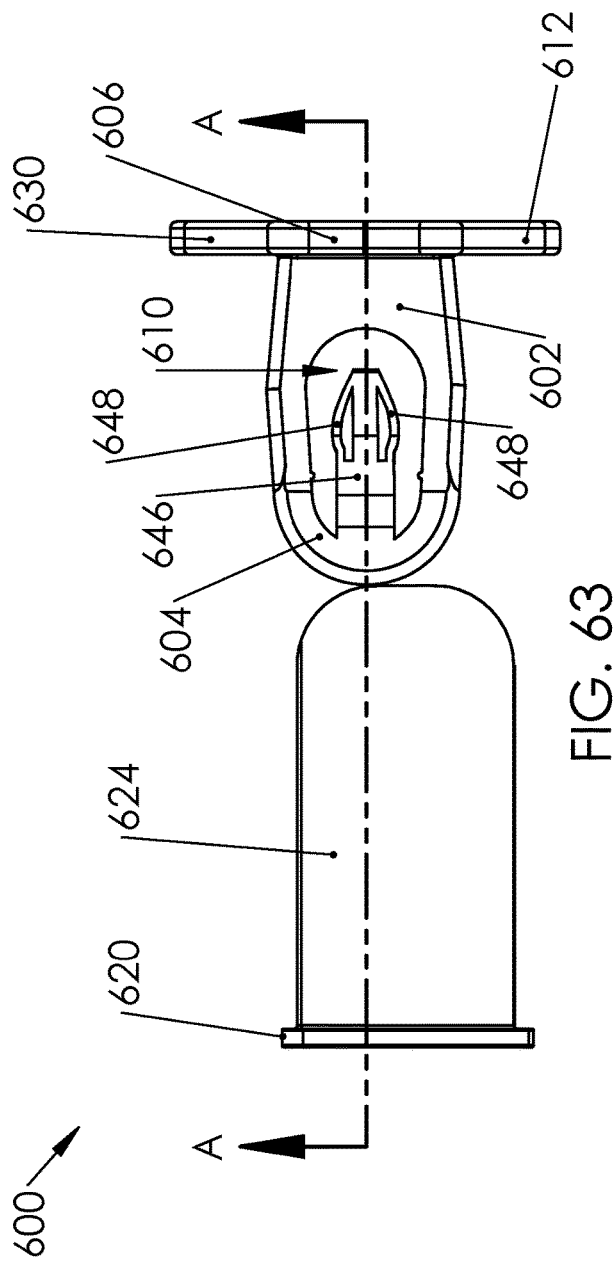
FIG. 63 is a top view thereof.
Figure 64:
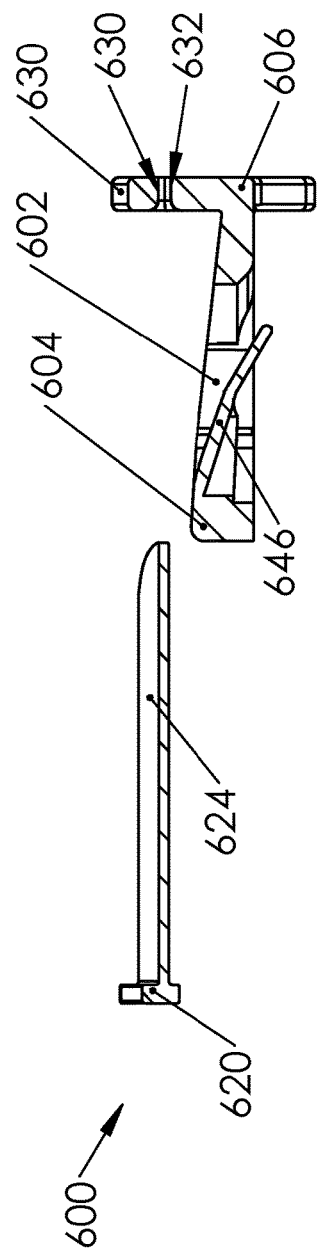
FIG. 64 is a side elevation view, in cross section, thereof.
Figure 71:
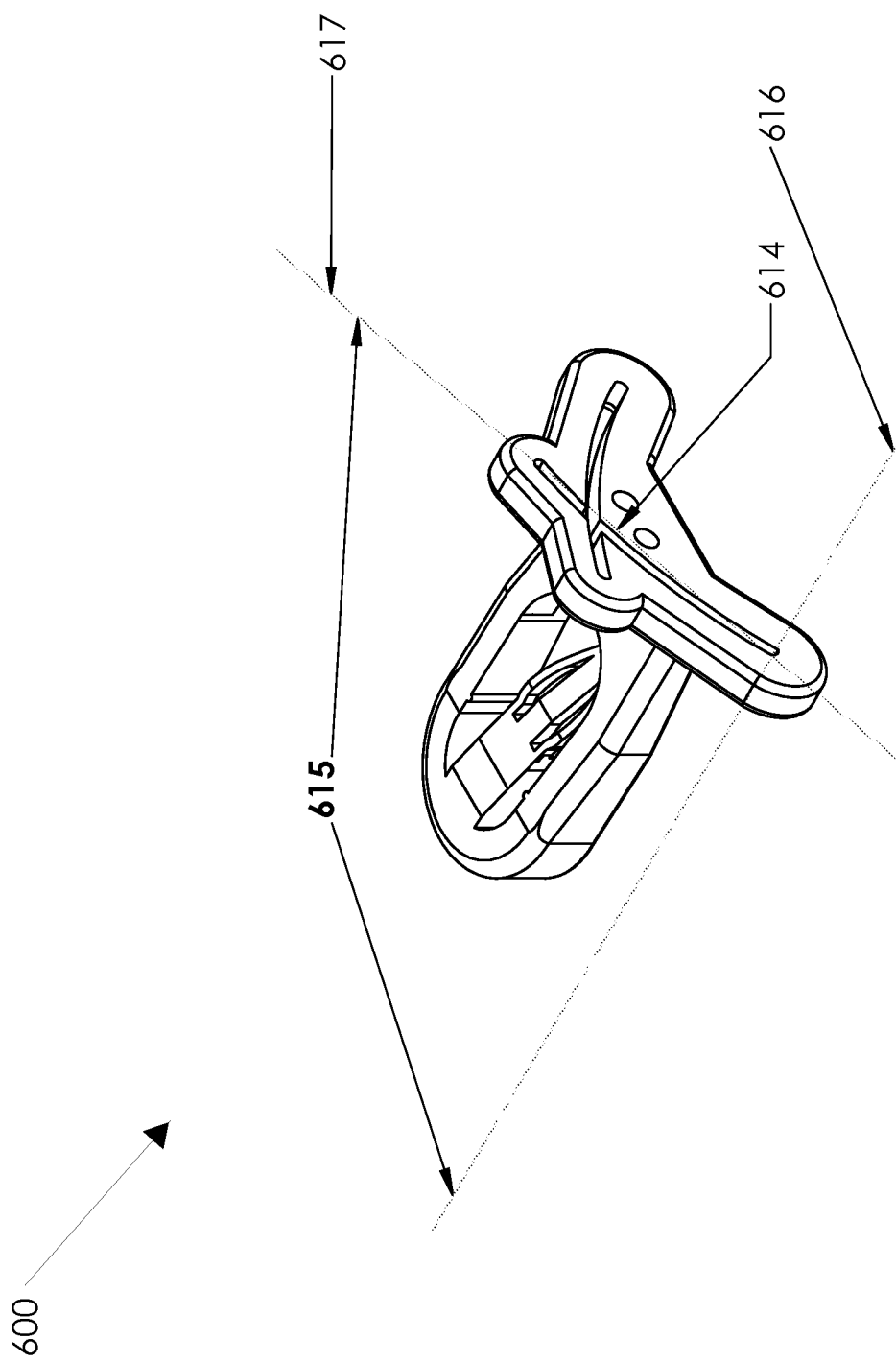
FIG. 71 is a top front left perspective view thereof, illustrating the plane of the elongated retention slot, in accordance with embodiments of the invention.
Figure 72:
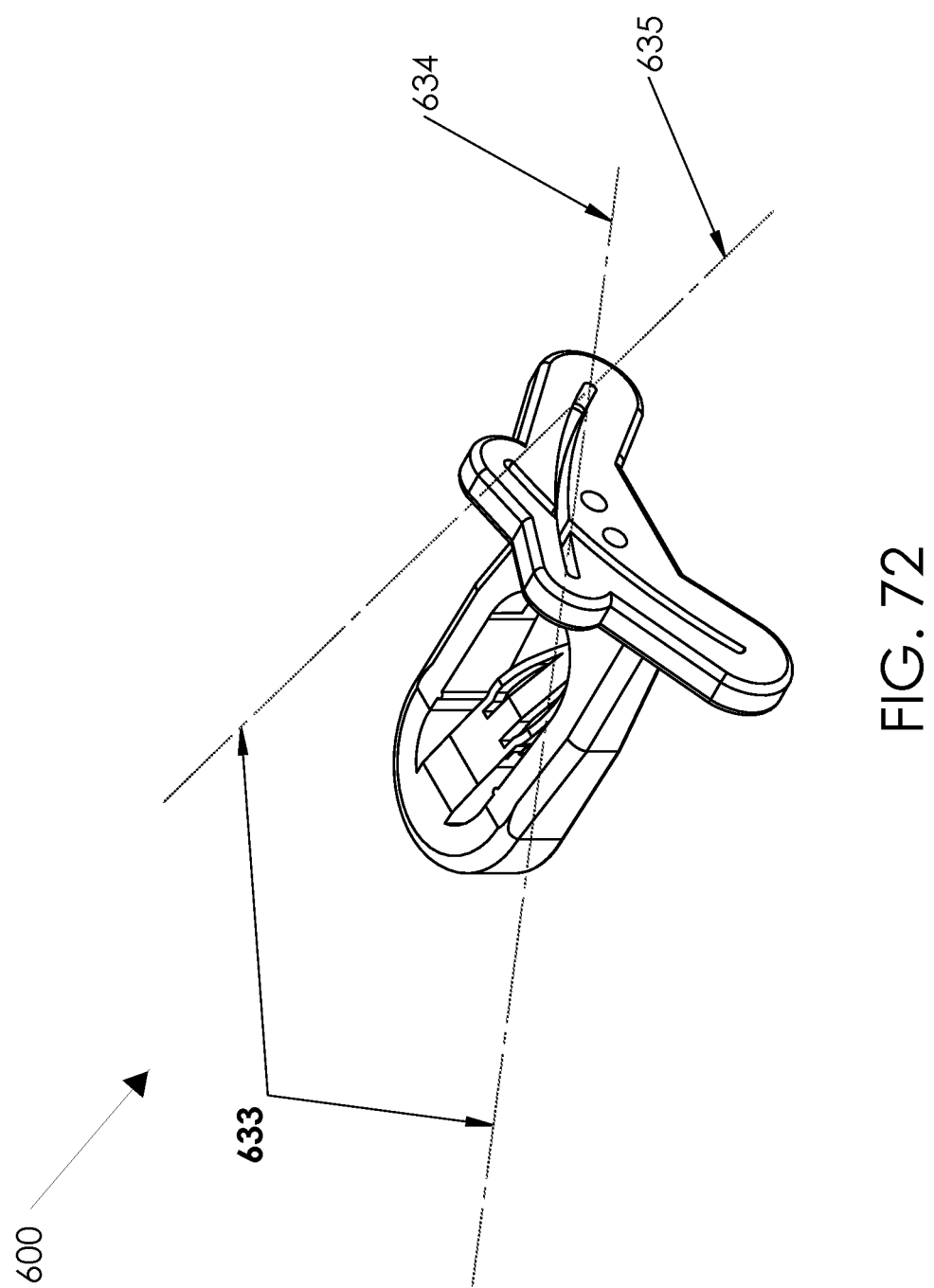
FIG. 72 is a top front left perspective view thereof, illustrating the plane of the second elongated retention slot, in accordance with embodiments of the invention.
Figure 73:
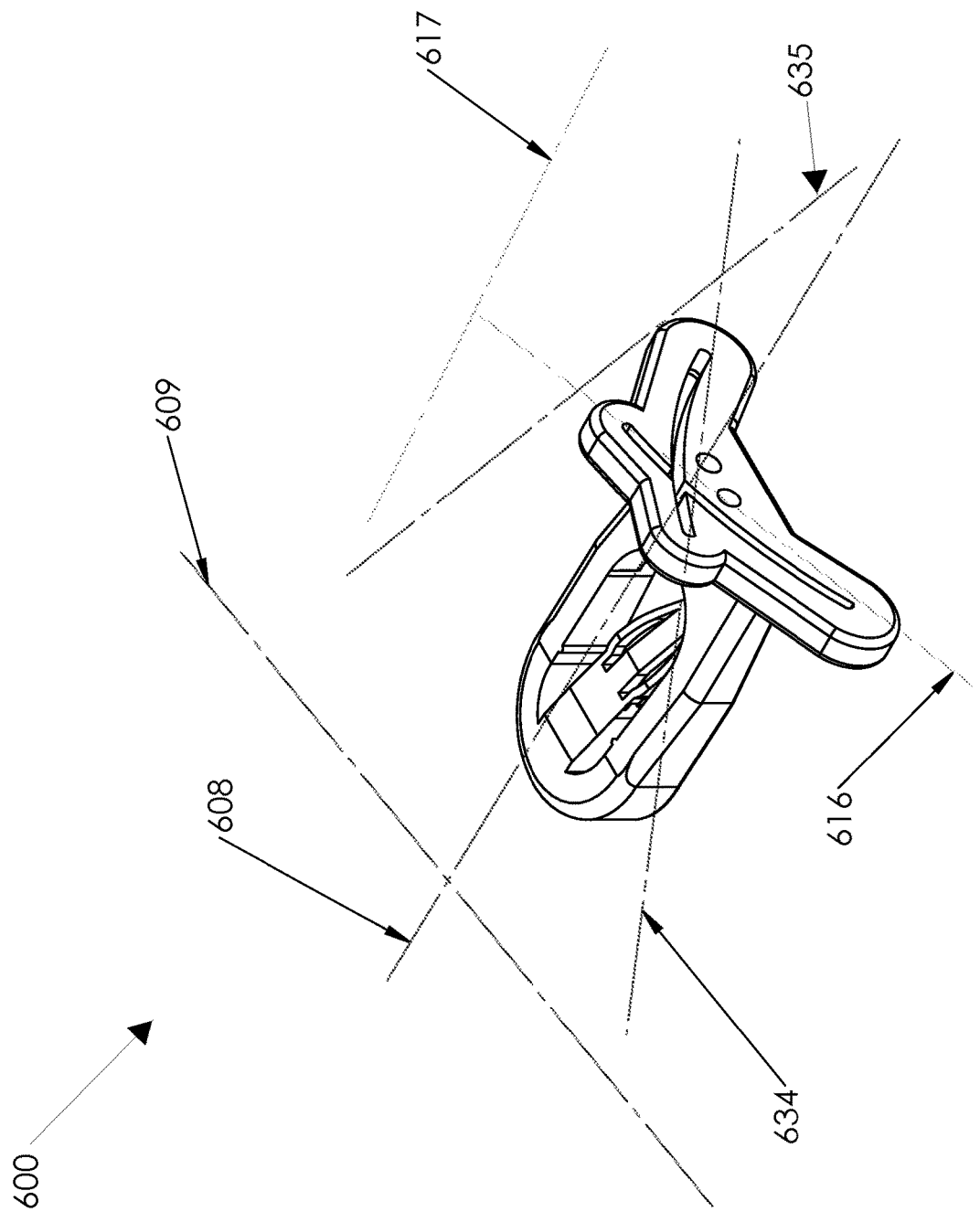
FIG. 73 is a top front left perspective view thereof, illustrating the intersection of the different planes of the invention, in accordance with embodiments of the invention.
Figure 74:
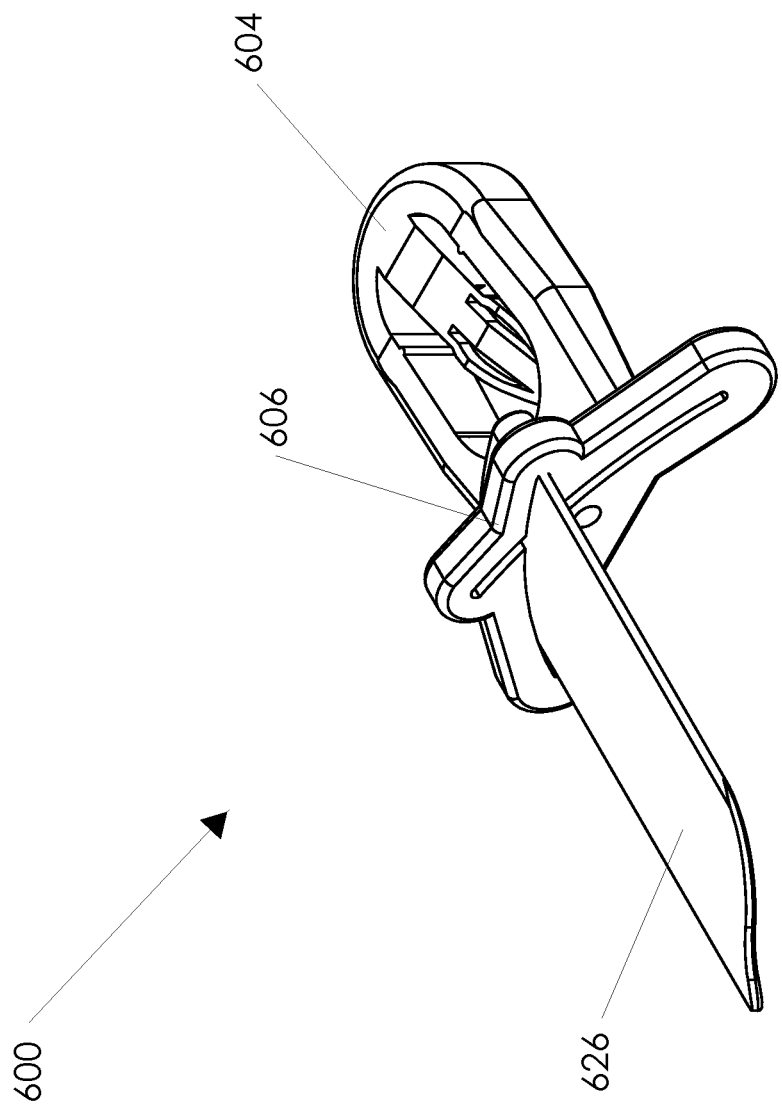
FIG. 74 is a perspective view of an exemplary multitool retention device with an exemplary fan tool attached thereto, in accordance with embodiments of the invention.

In accordance with embodiments of the invention, there is provided a multitool retention device 600 for use with a rotary trimmer head assembly 10 configured with one or more receptacles 16*a*. As illustrated in FIGS. 55-75, the multitool retention device 600 has a connection frame 602 having a trimmer head connecting end 604 opposite a tool retention end 606. As illustrated in FIG. 70, the connecting end 604 has a substantially horizontal plane 607, which is represented by the two perpendicular axes 608 and 609. Preferably, the connecting end 604 defines a mount aperture 610 adapted to receive the receptacle 16*a*, as shown in FIGS. 55-75. As illustrated in FIGS. 56 and 62, the tool retention end 606 has at least one tool retention arm 612 defining an elongated retention slot 614. As illustrated in FIG. 71, the elongated retention slot 614 preferably has a plane 615, which is represented by the two perpendicular axes 616 and 617. The plane 615 intersects the horizontal plane 607 of the connecting end 604, as shown in FIG. 73. As illustrated in FIGS. 55-64, the elongated retention slot 614 is configured to slidingly receive and retain at least one planar tool member 618. As shown in FIGS. 56, 59-64, and 67, the planar tool member 618 has a flange 620 at one end 622 of the tool member 618 having a size larger than the elongated retention slot 614 to prevent the tool 618, for example such as a blade 624, fan 626, or broom 628 (FIGS. 68, 69, 74) from releasing out of the elongated slot 614 during operation of the rotary trimmer head 10, e.g., by centrifugal force. The tool retention end 606 preferably includes a flanged arm 650 having a plane 615 perpendicular to the horizontal plane 607 wherein the flanged arm 650 defines a tool retention slot 614. In one embodiment, the flanged arm 650 is bowed.

In one embodiment, as illustrated in FIGS. 55-75, the multitool retention device 600 has at least one second tool retention arm 630 defining a respective second elongated retention slot 632. The respective second elongated retention slot 632 has a plane 633, as illustrated in FIG. 72, which is represented by the two perpendicular axes 634 and 635, that intersects the horizontal plane 607 of the connecting end 604. The elongated slot 632 is configured to slidingly receive and retain at least one planar tool member 618 comprising a flange 620 at one end 622 of the tool member 618 having a size larger than the elongated retention slot 632 for preventing the tool 618, for example such as a blower blade 624 (FIGS. 55-67), fan 626 (FIG. 74), or broom 628 (FIGS. 68-69), from releasing out of the elongated slot 632 during operation of the rotary trimmer head 10, e.g., by centrifugal force.

In another embodiment, the elongated retention slot 614 of the at least one tool retention arm 612 intersects the second elongated retention slot 632 of the at least one second tool retention arm 630, as illustrated in FIGS. 55-75. The tool retention arms 612, 630 define a pair of intersecting tool retention slots 614, 632 configured to receive one tool 618, wherein when the tool 618, such as a blower blade 624, is disposed within the first tool retention slot 614, the tool 618 directs air flow away from the rotary trimmer head assembly 10 when the rotary trimmer head 10 is rotating clockwise, and wherein when a tool 618 disposed within the second tool retention slot 632, the tool 618 directs air flow away from the rotary trimmer head assembly 10 when the rotary trimmer head 10 is rotating counterclockwise.

In yet another embodiment, the plane 615 of the at least one elongated retention slot 614 of the at least one tool retention arm 612 intersects the plane 633 of the at least one second elongated retention slot 632 of the at least one second tool retention arm 630.

In one embodiment, the tool 618 of the multitool retention device 600 is a blower blade 624, shown in FIGS. 55-67.

In another embodiment, the tool 618 of the multitool retention device 600 is a broom 628, shown in FIGS. 68-69.

In yet another embodiment, as illustrated in FIGS. 56, 58, 61-62, and 65, the tool retention arm 612 further defines two, spaced but adjacent, parallel trimmer line retention holes 636 with the material between each of the two holes 636 serving as a central member 638 about which a respective, bent back, flexible trimmer line 640 is adapted to be received and retained with a central crook 642 of the bent back trimmer line 640 being wrapped around the central member 638 such that distal ends 644 of the trimmer line 640 extend completely through the retention holes 636 with each distal end 644 of the trimmer line 640 extending out of and past each respective retention hole 636, as shown in FIG. 75. The retention holes are configured to receive commercially available trimmer lines such as flexible monofilament plastic trimmer lines of any suitable type and cross-sectional configuration, e.g., 0.065, 0.080, 0.095, 0.105, 0.12, 0.13 or 0.15 gauge nylon trimmer line or the like.

In one embodiment, the planes 615 and 633 of the respective elongated slots 614 and 632 are arcuate. The arcuate shape results in increased production of aerodynamic force by tool attachments, such as blower blades 624. This causes the air above the rotary trimmer head 10 assembly to be pulled down by the blower blades 624 and increase in velocity, therefore increasing the efficiency of the blower blade 624.

In another embodiment the connecting end 604 of the multitool retention device 600 has a male plug member 646 disposed within the mount aperture 610, as illustrated in FIGS. 55-75. The male plug connection member 646 has at least one resilient inwardly deformable spring arm 648. The at least one spring arm 648 is shaped so as to urge the spring arm 648 inwardly upon insertion of the male plug member 646 into the receptacle 16*a*. In other words, the spring arm 648 is preferably shaped in an outwardly bowed manner such that the receptacle 16*a* urges the spring arm 648 inwardly upon insertion of the male plug member 646 into the receptacle 16*a*. The spring arm 648 flexes outwardly upon passage through the receptacle 16*a* so as to retain the male plug connection member 646 from being inadvertently urged through the receptacle 16*a*. This combination of the male plug member 646 and the female receptacle 16*a* provides increased support for the tool member 618 and ensures that the multitool retention device 600 is not ejected from the rotary trimmer head assembly 10 through centrifugal force during operation.

In another preferred embodiment, as illustrated in FIGS. 55-75, there is provided a multitool retention device 600 for use with a rotary trimmer head assembly 10 configured with one or more receptacles 16*a*. Preferably, the multitool retention device 600 has a connection frame 602 having a trimmer head connecting end 604 opposite a tool retention end 606. Preferably, the connecting end 604 has a substantially horizontal plane 607 and the connecting end 604 defines a mount aperture 610 adapted to receive the receptacle 16*a*. The tool retention end 606 has a first retention arm 612 intersecting a second retention arm 630, each intersecting retention arms 612, 630 define a respective retention slots 614, 632 adapted to slidingly receive and retain at least one blower blade 624 or broom member 628. When the at least one blower blade 624 or broom member 628 is disposed within the elongated slot 614 of the first retention arm 612 the at least one blower blade 624 or broom member 628 directs air flow away from the rotary trimmer head assembly 10 when the rotary trimmer head 10 is rotating clockwise. When the at least one blower blade 624 or broom member 628 is disposed within the elongated slot 632 of the second retention arm 630 the at least one blower blade 624 or broom member 628 directs air flow toward the rotary trimmer head assembly 10 when the rotary trimmer head 10 is rotating counterclockwise.

In one embodiment, as illustrated in FIGS. 56, 58, 61-62, and 65, the tool retention end 606 defines two, spaced but adjacent, parallel trimmer line retention holes 636 with the material between each of the two holes 636 serving as a central member 638 about which a respective, bent back, flexible trimmer line 640 is adapted to be received and retained with a central crook 642 of the bent back trimmer line 640 being wrapped around the central member 638 such that distal ends 644 of the trimmer line 640 extend completely through the retention holes 636 with each distal end 644 of the trimmer line 640 extending out of and past each respective retention hole 636, as illustrated in FIG. 75. The retention holes are configured to receive commercially available trimmer lines such as flexible monofilament plastic trimmer lines of any suitable type and cross-sectional configuration, e.g., 0.065, 0.080, 0.095, 0.105, 0.12, 0.13 or 0.15 gauge nylon trimmer line or the like.

In another embodiment, the connecting end 604 comprises a male plug member 646 disposed within the mount aperture 610, as shown in FIGS. 55-75. The male plug connection member 646 has at least one resilient inwardly deformable spring arm 648. The at least one spring arm 648 is shaped so as to urge the spring arm 648 inwardly upon insertion of the male plug member 646 into the receptacle 16a. The spring arm 648 flexes outwardly upon passage through the receptacle 16a so as to retain the male plug connection member 646 from being inadvertently urged through the receptacle 16a.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

What is claimed is:

1. A tool attachment for use with a rotary trimmer head assembly configured with one or more swiveling female receptacles, the tool attachment comprising:

a planar body defining a tool mount aperture adapted to receive the swiveling female receptacle, said planar body comprising a connecting end and a tool end, said connecting end comprising the tool mount aperture, and said tool end having a tool member;

a male tongue member disposed within said tool mount aperture of said connecting end, said male tongue member comprising a proximal end and a distal end, said proximal end fixed within the tool mount aperture and said distal end fixed to said connecting end; and a pair of resiliently flexible spring arms attached to said distal end of the male tongue member, wherein the spring arms are shaped to be couplable with the female receptacle, said spring arms compressing inwardly upon insertion of the tongue member through said female receptacle, said spring arms expanding outwardly upon traverse of said female receptacle so as to maintain said male tongue member within said female receptacle and said spring arms abutting said female receptacle.

2. The tool attachment of claim 1, wherein the tool member is a fixed cutting blade.

3. The tool attachment of claim 1, wherein the tool member is a fixed blower blade.

4. The tool attachment of claim 1, wherein the tool member is a fixed propeller.

5. The tool attachment of claim 1, wherein the tool member comprises a tool retention end adapted to receive at least one removable tool member, wherein said tool retention end comprises a first retention arm and a second retention arm intersecting said first retention arm, each intersecting retention arm defining a respective retention slot adapted to slidingly receive and retain the at least one removable tool member.

6. The tool attachment of claim 5, wherein the at least one removable tool member further comprises a flange at one end of said removable tool member having a size larger than the retention slot for preventing said removable tool member from releasing out of the slot during operation of the rotary trimmer head assembly.

7. The tool attachment of claim 6, wherein the at least one removable tool member is a removable blower blade.

8. The tool attachment of claim 6, wherein the at least one removable tool member is a removable broom.

9. The tool attachment of claim 5, wherein the tool retention end defines two, spaced but adjacent, parallel trimmer line retention holes with the material between said two holes serving as a central member about which a respective, bent back, flexible trimmer line is adapted to be received and retained with a central crook of the bent back trimmer line being wrapped around said central member such that distal ends of the trimmer line extend completely through said retention holes with each distal end of the trimmer line extending out of and past each respective retention hole.

* * * * *